(12) United States Patent
Havewala et al.

(10) Patent No.: US 8,341,198 B1
(45) Date of Patent: Dec. 25, 2012

(54) FILE SYSTEM REPAIR WITH CONTINUOUS DATA AVAILABILITY

(75) Inventors: Sarosh C. Havewala, Kirkland, WA (US); Alan M. Warwick, Bellevue, WA (US); Kiran Kumar G. Bangalore, Sammamish, WA (US); Vinod R. Shankar, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/241,217

(22) Filed: Sep. 23, 2011

(51) Int. Cl.
*G06F 17/30* (2006.01)

(52) U.S. Cl. ........ 707/823; 707/674; 707/821; 714/100; 709/213; 713/1

(58) Field of Classification Search ........................ None
See application file for complete search history.

(56) References Cited

U.S. PATENT DOCUMENTS

| | | | |
|---|---|---|---|
| 5,765,151 A | | 6/1998 | Senator |
| 5,995,964 A * | | 11/1999 | Hoshiina et al. ................. 1/1 |
| 6,854,072 B1 * | | 2/2005 | Cagle et al. ................. 714/15 |
| 6,944,785 B2 | | 9/2005 | Gadir et al. |
| 6,983,362 B1 | | 1/2006 | Kidder et al. |
| 7,383,463 B2 | | 6/2008 | Hayden et al. |
| 7,523,343 B2 | | 4/2009 | Leis et al. |
| 7,653,699 B1 * | | 1/2010 | Colgrove et al. ............. 709/213 |
| 7,680,844 B2 * | | 3/2010 | Brown ................... 707/999.204 |
| 7,934,119 B2 | | 4/2011 | Takamoto et al. |
| 2002/0065876 A1 * | | 5/2002 | Chien et al. .................. 709/203 |
| 2004/0006565 A1 * | | 1/2004 | Shmueli .......................... 707/10 |
| 2005/0097141 A1 | | 5/2005 | Loafman et al. |
| 2010/0106755 A1 * | | 4/2010 | Brown .......................... 707/827 |

OTHER PUBLICATIONS

Gunawi, et al., "Improving File System Reliability with I/O Shepherding", Retrieved at <<http://www.sosp2007.org/papers/sosp068-gunawi.pdf>>, Proceedings of twenty-first ACM SIGOPS symposium on Operating systems principles, vol. 41, No. 6, Oct. 14-17, 2007, pp. 14.

Frayer, et al., "Verifying File System Consistency at Runtime", Retrieved at <<https://tspace.library.utoronto.ca/bitstream/1807/27754/1/paper.pdf>>, Appears in Collections of Technical reports, Jun. 17, 2011, pp. 1-14.

"Proactive Error Scan and Isolated Error Correction", U.S. Appl. No. 12/970,954, filed Dec. 17, 2010, pp. 34.

"Volumes And File System in Cluster Shared Volumes", U.S. Appl. No. 12/971,322, field Dec. 17, 2010, pp. 38.

* cited by examiner

*Primary Examiner* — Hung Le

(57) ABSTRACT

Volumes of a file system environment are taken offline when they require repair for confirmed corruptions. Applications utilize handles, both real and, in environments where proxy file systems are overlaid upon the real file system(s), proxy, to access objects stored on volumes of a file system environment. Real handles are closed when the volume storing the objects for the real handles is taken offline, terminating applications' access to the volume's objects. New real handles are automatically generated for those volume objects that had a real handle prior to the volume going offline for corruption correction processing and which were not altered during the corruption correction processing. Applications accessing these objects can continue to use their original proxy handle, which is subsequently correlated with an automatically established new real handle, to access the objects.

20 Claims, 8 Drawing Sheets

FILE SYSTEM REPAIR WITH CONTINUOUS DATA AVAILABILITY

CROSS-REFERENCE TO RELATED APPLICATIONS

This application is related to commonly assigned, co-pending U.S. patent application Ser. No. 12/970,954, entitled "Proactive Error Scan And Isolated Error Correction", which is incorporated herein by reference in its entirety. This application is also related to commonly assigned, co-pending U.S. patent application Ser. No. 12/971,322, entitled "Volumes And File System In Cluster Shared Volumes", which is incorporated herein by reference in its entirety.

BACKGROUND

Real file systems utilize data structures, also referred to as the file system on-disk format, to persist, i.e., maintain and organize, data to stable storage, e.g., a volume, disk, hard drive, etc. File systems access the data and interpret these data structures to store and retrieve data for users and applications, or procedures or computer programs, when executing software instructions or computer code.

Volume on-disk format availability is a high priority for many business operations. From small businesses to global enterprises, more and more industries are increasingly finding it important for their business to be able to access data to service customers around the clock. To this end there is an increased reliance on server-based systems to power business activities, and thus, server services are also being relied on to execute continuously around the clock. To meet these needs and the required business capacity, server systems can host virtual file systems that are used above a real file system and support more applications reading and writing to the real file system data, via these virtual file systems. Moreover virtual file systems allow for increased flexibility in the allocation of real file system volumes, disks and data arrays.

As noted, a virtual file system sits on top of the real file system. The virtual file system services application access to files, and thus data, on a volume through the use of file handles in the virtual file system, also referred to herein as virtual handles, for use by the application and corresponding file handles to the underlying real file system, also referred to herein as real handles. The virtual file system services application I/O operations by redirecting requests issued on a virtual handle to the corresponding real handle, and thus the intended volume file.

When the real file system encounters an error, also referred to as a corruption, the real file system notes the error and flags the volume as corrupt. Repairing the error can require exclusive access to the volume which, in turn, requires that all real handles to files on the volume must be torn down, or otherwise discarded. Each application that is accessing the volume at the time the error is corrected must reset their access to the respective volume files. This can be very disruptive to the server system and the business that relies upon the data it manages, which can translate into customer dissatisfaction and loss of business.

Thus it is desirable to minimize volume error correction processing on applications that are not utilizing the volume files that require repair by maintaining the applications' virtual handles and re-establishing respective real handles without application intervention. It would also be desirable to perform volume repairs requiring exclusive volume access in a timely manner in order to help ensure that applications that are not accessing volume files requiring repair do not timeout, and thus become negatively affected by the repair, while waiting for the volume to once more become available for their use.

SUMMARY

This summary is provided to introduce a selection of concepts in a simplified form which are further described below in the Detailed Description. This summary is not intended to identify key or essential features of the claimed subject matter, nor is it intended to be used as an aid in determining the scope of the claimed subject matter.

Embodiments discussed herein include systems and methodology for determining which applications that are currently accessing a volume requiring exclusive repair access, i.e., the volume is offline during the repair processing, will not be affected by the repair as they are not accessing the volume file(s) requiring correction or they are accessing volume file(s) with corruptions that can be repaired without affecting the virtual handles to them.

In embodiments when a volume has one or more corruptions that require exclusive access to the volume for repair, a list of the file ids for the affected, i.e., corrupted, volume files is generated. In embodiments this list of file ids is used to determine which virtual handles, and subsequently, which applications, will be affected by the volume repair because they access a corrupted volume file, also referred to herein as an object. In embodiments this list of file ids is also used to identify the applications that are currently accessing unaffected, i.e., non-corrupted, volume files, and thus, can have their processing continue with nominal delay and no application intervention subsequent to the volume repair.

In embodiments the identified corruptions for a volume's files are categorized and those corruptions that can be corrected without affecting the virtual handles to the corresponding file are determined. In embodiments the file ids for these files are used to identify applications that are currently accessing what are effectively unaffected volume files, and thus, can have their processing continue with nominal delay and no application intervention subsequent to the volume repair. In embodiments the virtual handles to unaffected volume files are maintained during volume repair and when the volume is brought back online corresponding real handles are again generated for these virtual handles so that the applications' volume access can continue. In embodiments applications' I/O is queued during volume repair requiring exclusive volume access and the queued I/O for those applications that access unaffected volume files is performed when the repaired volume comes back online.

In embodiments volume repair requiring exclusive volume access is performed in a timely manner to help ensure applications' queued I/O does not time out, and thus, itself negatively impact an application's processing with the volume.

BRIEF DESCRIPTION OF THE DRAWINGS

These and other features will now be described with reference to the drawings of certain embodiments and examples which are intended to illustrate and not to limit, and in which.

DETAILED DESCRIPTION

In the following description, for purposes of explanation, numerous specific details are set forth in order to provide a thorough understanding of embodiments described herein. It will be apparent however to one skilled in the art that the embodiments may be practiced without these specific details. In other instances well-known structures and devices are either simply referenced or shown in block diagram form in order to avoid unnecessary obscuration. Any and all titles used throughout are for ease of explanation only and are not for any limiting use.

Figure 1:
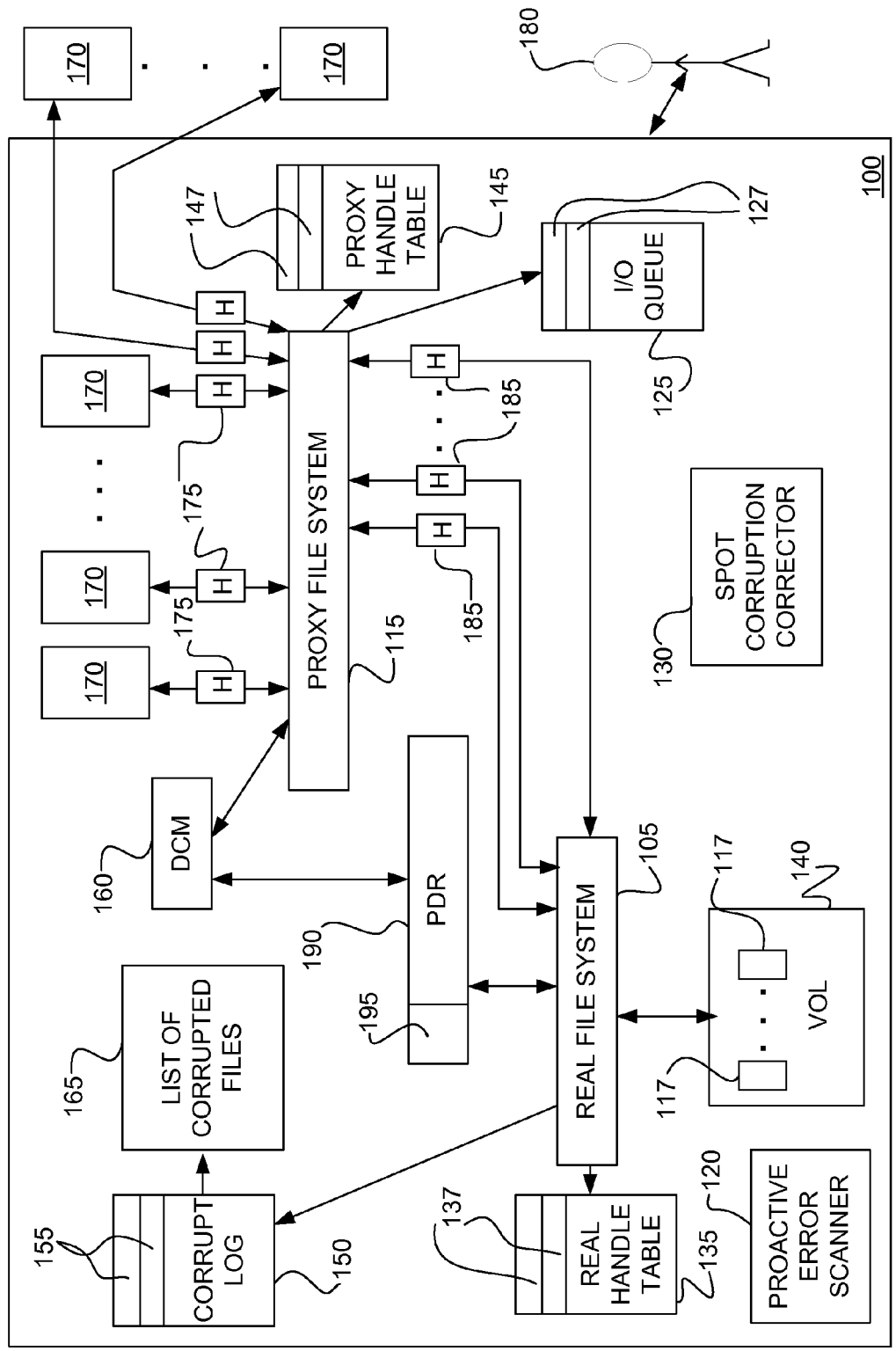
FIG. 1 depicts an embodiment file system supporting continuous data availability when the volume requires repair.

FIG. 1 depicts an embodiment file system environment 100 supporting continuous data availability even when a volume requires file system repair. In an embodiment the file system environment 100 has one or more volumes 140 that store objects 117, i.e., files of programs and/or data, for use by processing applications, tasks, programs, routines, etc., collectively referred to as applications, or app(s), 170, and users 180.

In an embodiment various applications 170 can access an object 117 stored on a volume 140 with the use of handles as further described below.

In embodiments applications 170 that access one or more volumes 140 of the file system environment 100 can be part of the file system environment 100 and/or separate from the file system environment 100.

In an embodiment the file system environment 100 supports logical, i.e., proxy, file systems 115 overlaid on the physical, i.e., real, file systems 105 that manage and support the file system's volumes 140. Although only one real file system 105, also referred to herein as a real f/s 105, component and one proxy file system 115, also referred to herein as a proxy f/s 115, component are depicted in FIG. 1, embodiment file system environments 100 contain one real f/s 105 and one or more corresponding overlaid proxy f/s 115 for each volume 140 of the file system environment 100.

In an embodiment a proxy f/s 115 does not have to be resident on the same node, i.e., computing device, as the real f/s 105 it is overlaid upon; i.e., a cluster file system environment 100 with various nodes is supported. In another embodiment the proxy file system(s) 115 is (are) resident on the same node as the real f/s 105 it (they) is (are) overlaid upon; i.e., a single node file system environment 100 is supported.

An embodiment file system environment 100 has a distributed control manager 160 component, also referred to herein as a DCM 160. In an embodiment the DCM 160 is responsible for managing the file system environment 100 and its various components, including the real f/s 105 and the proxy f/s 115 overlaid thereon. In an embodiment the DCM 160 is a distributed component that is on each node where there is a proxy f/s 115 of the file system environment 100.

An embodiment file system environment 100 has a physical disk resource 190, also referred to herein as a PDR 190. In an embodiment the PDR 190 is responsible for managing the physical, i.e., real, file system resources, e.g., the real f/s 105 and volumes 140 of the file system environment 100. In an embodiment there is one PDR 190 for each real f/s 105 and its corresponding volume 140.

As noted, in an embodiment there is one real f/s 105 for each volume 140 of the file system environment 100 that manages and supports the respective volume 140. In an embodiment each real f/s 105 generates and maintains a real handle table 135 where information for the file handles 185 to the underlying real file system, also referred to herein as real handles 185, is stored.

In an embodiment a real handle 185 is a representation that is used to inform the file system environment 100 which object 117 stored on a volume 140 an app 170 is accessing. In an embodiment a real handle 185 is generated when an app 170 first attempts to access, e.g., open, an object 117 on a volume 140. In an embodiment a real handle 185 is closed, or no longer used, collectively referred to herein as closed, when the app 170 closes the object 117 on the volume 140 it previously opened. In an embodiment a real handle 185 is also closed when the volume 140 on which the real handle's respective object 117 is stored is no longer to be available, e.g., the volume 140 on which the object 117 is stored is being taken offline for access by apps 170 when one or more of the volume's objects 117 has an error that efforts to repair are to be made.

In an embodiment a real handle table 135 contains an entry 137 for each real handle 185 generated for an app 170 to have access to an object 117, e.g., a file, stored on the corresponding volume 140 for the real f/s 105. In an embodiment a real handle table 135 is used to keep track of the real handles 185 that are currently established and open for access to objects 117 stored on the volume 140 for the real f/s 105.

As previously noted, in an embodiment one or more proxy f/s 115 are overlaid on a real f/s 105 for supporting app 170 access to the corresponding volume 140 and the objects 170 stored thereon. In an embodiment each proxy f/s 115 generates and maintains a proxy handle table 145 where information for the file handles 175 to the proxy file system, also referred to herein as proxy handles 175, is stored.

In an embodiment a proxy handle 175 is a second, proxy, representation that is used by an app 170 to gain access to an object 117 on a volume 140. In an embodiment when an app 170 first attempts to access, e.g., open, an object 117 on a volume 140, once the real handle 185 for this access is generated by the real f/s 105, the real handle 185 is provided to the proxy f/s 115 supporting the app 170. In an embodiment the proxy f/s 115 then generates a second, proxy, handle 175 for the real handle 185. In an embodiment the proxy f/s 115 provides the proxy handle 175 to the app 170 for use by the app 170 when it accesses the volume object 117.

In an embodiment a proxy handle 175 is closed, or no longer used, when the app 170 closes the object 117 it previously opened. In an embodiment a proxy handle 175 is also closed, or no longer used, in cases where the underlying object 117 has a corruption for which its volume 140 is to be taken offline for correction, as further discussed below.

In an embodiment a proxy handle table 145 contains an entry 147 for each proxy handle 175 generated for an app 170 to have access to an object 117 stored on the corresponding volume 140 for the proxy f/s 115. In an embodiment a proxy handle table 145 is used to keep track of the proxy handles 175 and their corresponding real handles 185 that are currently established and open for access to objects 117 stored on a volume 140.

In an embodiment the proxy f/s 115 maintains a mapping between the real handle 185 for an object 117 on its associated volume 140 and the corresponding proxy handle 175. In an embodiment, when an app 170 attempts to access an object 117 stored on a volume 140 the app 170 utilizes its proxy handle 175 for the object 117 with its access request. In an embodiment the proxy f/s 115 uses its mapping stored in the proxy handle table 145 to determine the real handle 185 corresponding to the proxy handle 175. In an embodiment the proxy f/s 115 then forwards the real handle 185 with the app 170's access request to the real f/s 105 for processing of the object 117 access request, e.g., read or write.

Referring to FIG. 2, an embodiment proxy handle table 145 contains various exemplary entries 147. In an embodiment each proxy table entry 147 has a various fields that are used to identify the respective proxy handle 175, identify the object 117 for which the proxy handle 175 exists, and provide a mapping between the respective proxy handle 175 and its corresponding real handle 185.

In an embodiment each proxy table entry 147 has a proxy handle field 230 that contains an identification of the proxy handle 175 for the proxy table entry 147.

In an embodiment each proxy table entry 147 has an object identity field 210 that identifies the object 117 for which the respective proxy handle 175 has been created. In an aspect of this embodiment the object identity field 210 contains the unique file identification, also referred to herein as a file id, for the object 117 associated with the proxy handle 175. In an embodiment a file id is a canonical name for a volume object 117; e.g., a file object 117 with a name of a.doc may have a file id of one-thousand (1000).

In an embodiment the proxy f/s 115 obtains the file id for an object 117 when it receives a real handle 185 for the object 117 from the real f/s 105 pursuant to an app access request.

In an embodiment each proxy table entry 147 has a real handle field 220 which contains an identification of the real handle 185 generated by the real f/s 105 for the object 117 identified in the object identity field 210.

In an embodiment each proxy table entry 147 has an app field 240 which identifies the application 170 for which the real handle 185/proxy handle 175 combination was generated for access to the object 117 identified in the object identity field 210.

Embodiment proxy table entries 147 can contain additional and/or different fields that provide information on the application's access to the object 117 with the identified real handle 185 and proxy handle 175, e.g., an object name field that identifies the name of the object 117 designated in the object identity field 210; an access field which identifies the access allowed for the app 170 noted in the app field 230 to the object 117 identified in the object identity field 210, e.g., read, write, etc.; etc.

In an embodiment each proxy table entry 147 has an invalid flag field 260 for use in determining whether the corresponding proxy handle 175 is valid and can continue to be used by the app 170 or not, as further explained below.

Referring again to FIG. 1, an embodiment file system environment 100 has a corruption detection component 120 that has the capability to identify confirmed corruptions on objects 117 stored on the volumes 140 of the file system environment 100, wherein a confirmed corruption comprises an error on an object 117 of a volume 140 that an attempt will be made to repair when the volume 140 is taken offline. In an aspect of this embodiment the corruption detection 120 is the proactive error scanner 120 described in co-pending U.S. patent application Ser. No. 12/970,954, entitled "Proactive Error Scan And Isolated Error Correction", which is incorporated herein by reference in its entirety.

In an embodiment the corruption detection 120, also referred to herein as the proactive error scanner 120, is a software application task that is initiated to execute by the file system environment 100 and has the capability to proactively scan, i.e., check, for errors, or corruptions, associated with the objects 117 stored on the file system's volumes 140.

In an embodiment if the proactive error scanner 120 identifies an error with a volume object 117 the volume object 117 has a confirmed corruption. In an embodiment, if after processing a volume 140 the proactive error scanner 120 did not identify any corruptions for a volume object 117 the object 117 is error free at this time.

In an embodiment the proactive error scanner 120 scans for corruptions on all of the file system's volumes 140. In an alternative embodiment the proactive error scanner 120 only scans for corruptions on the volumes 140 of the file system environment 100 that have previously identified, and still existing, corruptions thereon.

In an embodiment the proactive error scanner 120 executes periodically to scan for corruptions of various file system volumes 140. In an embodiment when the proactive error scanner 120 identifies a corruption on a volume 140 that cannot be corrected while the volume 140 is maintained online, and therefore accessible to access by applications 170, i.e., a confirmed corruption, an entry 155 is generated for the identified corruption in a volume corrupt log 150, e.g., a $corrupt file 150, also referred to herein as an error correction log, volume corruption log and/or corrupt log, for the respective volume 140.

In an embodiment each volume 140 of the file system environment 100 has an associated corrupt log 150 where the identification and status of confirmed corruptions for the volume 140 is reported. In other embodiments confirmed corruptions are reported by the use of other mechanisms, e.g., a single corrupt log 150 is utilized to report all confirmed corruptions for all volumes 140 of the file system environment 100, tables are maintained and written to keep track of volume confirmed corruptions, etc.

In an embodiment an entry 155 in a volume's corrupt log 150 identifies the affected object 117 via the file id assigned to the object 117.

In an embodiment the PDR 190 of the file system environment 100 includes a health check functionality 195 that executes to determine the health of the file system's volumes 140. In an aspect of this embodiment the health check functionality 195 is executed periodically, e.g., once a minute, once an hour, once a day, etc. on each of the volumes 140 of the file system environment 100.

In an embodiment the health check functionality 195 queries each real f/s 105 of the file system environment 100 as to whether its corresponding volume 140 has any confirmed corruptions. In an embodiment this can be determined by whether or not there are any entries 155 in the corrupt log 150 for a volume 140 at the time of the health check functionality 195 query.

In an embodiment if the volume 140 does have at least one confirmed corruption, i.e., the volume 140 has one or more corruptions that may only be corrected when the volume 140 is taken offline and therefore inaccessible to any apps 170, the real f/s 105 informs the PDR 190 of this situation in response to the PDR health check functionality's query. In an embodiment, upon learning that a volume 140 has at least one confirmed corruption, the PDR 190 requests the corrupt log 150 for the volume 140. In an embodiment the real f/s 105, in response, provides the requested corrupt log 150, or, alternatively, access thereto, to the PDR 190. In an alternative aspect of this embodiment, if a volume 140 has one or more confirmed corruptions the respective real f/s 105 will respond to a health check functionality 195 query with the corrupt log 150 for the affected volume 140.

In an embodiment upon receiving the corrupt log 150 for a volume 140, or access thereto, the PDR 190 scans the corrupt log 150 and extracts the file ids for the affected, i.e., corrupted, objects 117, i.e., the volume's objects 117 that have confirmed corruptions thereon, and generates a set of file ids 165 that includes these extracted file ids. In an aspect of this embodiment the set of file ids 165 is a list of the file ids for the corrupted objects 117.

In an embodiment the PDR 190 provides the set of file ids 165, also referred to herein as the list of corrupted files 165, or access thereto, to the DCM 160. In an embodiment the list of corrupted files 165 generated for a volume 140 contains an identification of each object 117 of the volume 140 that has a confirmed corruption for which there is an entry in the volume's corrupt log 150. In an aspect of this embodiment the identification of an affected object 117 in the list of corrupted files 165 is the object's file id.

In an embodiment the list of corrupted files 165 generated for a volume 140 contains an identification of the gravity of the corruption for each object 117 represented therein. In an aspect of this embodiment the identification of the gravity of the corruption for each object 117 represented in a list of corrupted files 165 is a value that identifies the type of corruption that has been found associated with the object 117, e.g., orphan child, bad cluster, crosslink corruption, etc. In an alternative aspect of this embodiment the identification of the gravity of the corruption for each object 117 represented in a list of corrupted files 165 is a flag that signifies whether or not the corruption found associated with the object 117 is an object changing error.

In an embodiment an object changing error is a corruption that when fixed will have caused the object 117 to have altered in such a manner that any apps 170 that have been accessing the object 117 prior to the maintenance for corruption correction of the object 117 offline must be notified of the corruption and must establish new handles, i.e., a new real handle 185 and a new corresponding proxy handle 175, as discussed below, prior to any further attempted access to the object 117. In an embodiment an object changing error results in an app 170 being required to reset its access to the affected object 117. An exemplary object changing error is a file data corruption where some portion of an object 117 is lost and the remaining object 117, upon repair, is no longer the same size and no longer contains all the same information as the object 117 did prior to the file data corruption.

In an embodiment, if an object 117 has one or more confirmed corruptions that are not object changing errors then upon successful maintenance for correction of the object's corruptions the object 117 will be the same size and contain the same information as prior to having been corrupted. In an embodiment if an object with confirmed corruptions does not have any object changing errors then, upon successful maintenance for correction of its corruptions, and when the object's volume 140 is brought back online, the apps 170 that have been accessing the object 117 prior to the maintenance for corruption correction of the object 117 offline can have their access to the object 117 resumed with their existing proxy handle 175 previously established for the app 170's access to the now corrected object 117.

As noted, in an alternative aspect of an embodiment the identification of the gravity of the corruption for each object 117 represented in a list of corrupted files 165 is a flag that signifies whether or not the corruption is an object changing error. In one alternative aspect of an embodiment the flag is set when the affected object 117 has an object changing error. In another alternative aspect of an embodiment the flag is set when the affected object 117 does not have any object changing errors.

In an alternative embodiment if an object 117 of a volume 140 has one or more confirmed corruptions, i.e., there is at least one entry 155 in the corrupt log 150 for the object 117, but none of the object's error(s) are object changing errors then the object 117 is not identified in the list of corrupted files 165 for the volume 140.

In an embodiment objects 117 of a volume 140 that do not have any known corruptions will be unaffected by the offline correction of a volume's objects 117 that do have corruptions. Thus, when the volume 140 is brought back online after corruption correction the apps 170 that have been accessing these unaffected objects 117 can have their access to these unaffected objects 117 resumed with their respective existing proxy handles 175.

As previously noted, in an embodiment each proxy table entry 147 has an invalid flag field 260. In an embodiment when the DCM 160 receives the list of corrupted files 165 that identifies volume objects 117 with confirmed corruptions, or, alternatively, volume objects 117 with object changing errors, the DCM 160 provides the list of corrupted files 165 to the proxy f/s 115. In an embodiment the DCM 160 provides, or otherwise shares, the list of corrupted files 165 with the proxy file systems 115 on each node in the file system environment 100 supporting a proxy f/s 115.

In an embodiment, upon receiving the list of corrupted files 165 the proxy f/s 115 reviews the list of corrupted files 165 against the contents of the object identity field 210 in the various proxy handle entries 147 and sets the invalid flag field 260 for appropriate proxy handle entries 147. In a clustered file system environment 100 each proxy f/s 115 will perform these same actions when receiving a list of corrupted files 165 from the DCM 160.

In an embodiment the invalid flag field 260 for a proxy table entry 147 is set when the corresponding object 117 identified in the object identity field 210 has a corruption and its file id is contained in the list of corrupted files 165. In an embodiment the invalid flag field 260 for a proxy table entry 147 is set when the corresponding object 117 identified in the object identity field 210 is determined to have an object changing error as previously discussed.

In an embodiment the invalid flag field 260 for a proxy table entry 147 remains cleared, i.e., not set, when the corresponding object 117 identified in the object identity field 210 does not have a corruption. In an embodiment the invalid flag field 260 for a proxy table entry 147 remains cleared when the corresponding object 117 identified in the object identity field 210 does not have an object changing error.

In an alternative embodiment proxy table entries 147 do not include an invalid flag field 260 which is, rather, a separate flag associated with each currently existing proxy handle 175.

Referring again to FIG. 2A, three exemplary proxy table entries 147 are depicted prior to the volume 140 containing file object a.doc 215 and file object b.doc 225 is taken offline for corruption repair. The first exemplary proxy table entry 147 is for the file object a.doc 215, in this example a.doc 215 has a file id of one-thousand (1000) 217. In this example a.doc 215 has a real handle 185 a-hand 232 and a corresponding proxy handle 175 ap-hand 234. In this example a.doc 215 is being accessed by the application app1 242. In this example a.doc 215 does not have any confirmed corruptions at the time of the current health check functionality 195 query, and thus, the invalid flag field 260 for this first proxy table entry 147 for a.doc 215 is not set.

Figure 2A:
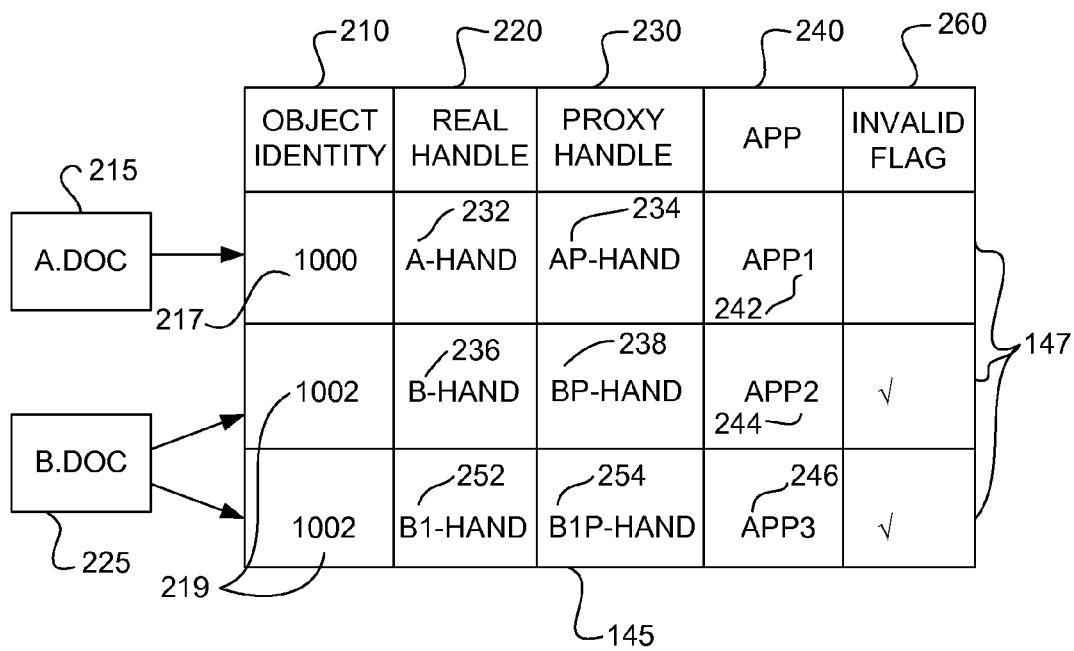
FIGS. 2A-2C depict an embodiment proxy handle table with exemplary handle entries during various file system environment processing phases.

The second and third proxy table entries 147 depicted in FIG. 2A are both for the file object b.doc 225. In this example b.doc 225 has a file id of one-thousand-and-two (1002) 219. In the second proxy table entry 147 example b.doc 225 has a real handle 185 b-hand 236 and a corresponding proxy handle 175 bp-hand 238 for application app2 244. In the third proxy table entry 147 example b.doc 225 has a real handle 185 bl-hand 252 and a corresponding proxy handle 175 blp-hand 254 for application app3 246.

In this example b.doc 225 does have at least one confirmed corruption, or, alternatively, at least one object changing error, at the time of the current health check functionality 195 query, and thus, the invalid flag field 260 for the second and third proxy table entries 147 for b.doc 225 is set.

Referring back to FIG. 1, in an embodiment the proxy f/s 115 has an associated queue 125 for queuing app object access requests to a volume 140 when the volume 140 is offline; e.g., the proactive error scanner 120 is attempting to correct one or more confirmed errors thereon while the volume 140 is offline and unavailable to any app 170.

In an embodiment, when the DCM 160 receives the list of corrupted files 165 for a volume 140, or access thereto, and a notification that the volume 140 is to be taken offline for attempted error corrections from the PDR 190 the DCM 160 commands each proxy f/s 115 for the volume 140 to go into a pause state.

In an embodiment, in preparation to enter a pause state, a proxy f/s 115 drains, e.g., flushes, its existing cache of volume access requests from the apps 170 currently with access to the volume's objects 117 and closes all the real handles 185 to the corresponding real f/s 105 for the volume 140. In an embodiment a proxy f/s 115 has no physical connections to the underlying real f/s 105 in a pause state and all app's I/O (input/output) to the corresponding volume 140 is paused. In an embodiment in a pause state, while the real handles 185 to the volume 140 are now gone, there is sufficient information maintained, e.g., in the proxy handle table 145, for the proxy f/s 115 to utilize to enable the real f/s 105 to open a new real handle 185 for those objects 117 whose proxy handle invalid flag 260 was not set when the volume 140 is taken offline for corruption correction. This regeneration of an app's connection to a volume object 117, via the creation of a new real handle 185 that is correlated with an existing proxy handle 175 for the object 117, is performed once the volume 140 is brought back online subsequent to error correction processing.

Figure 2B:
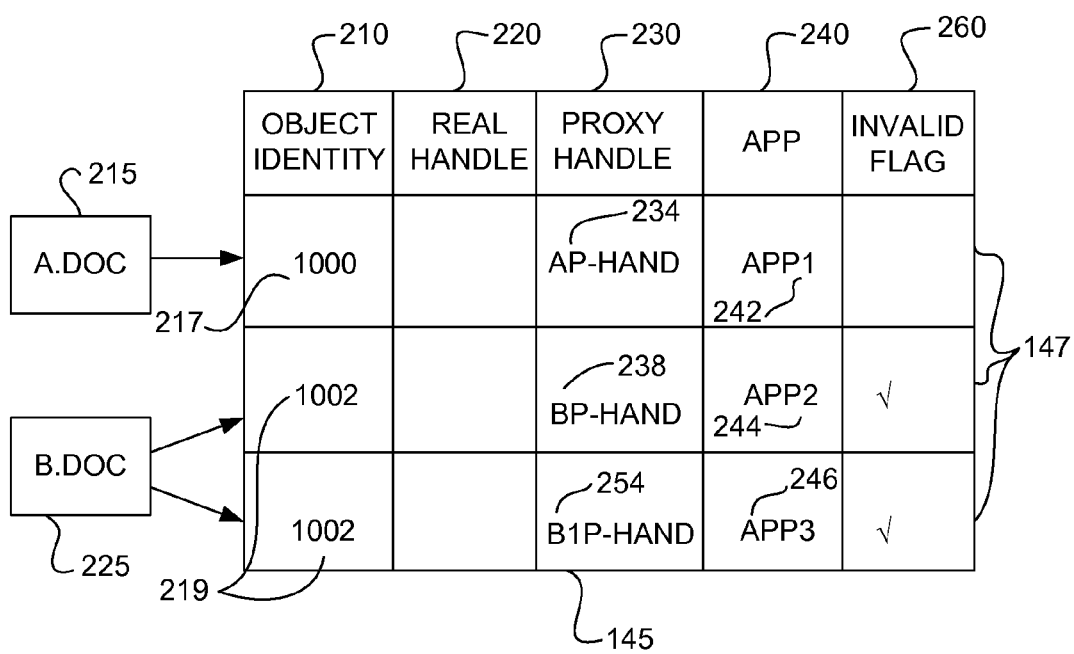

Referring to FIG. 2B, the three exemplary proxy table entries 147 of FIG. 2A are now depicted subsequent to the proxy f/s 115 entering the pause state and the volume 140 containing file object a.doc 215 and file object b.doc 225 being taken offline for corruption repair. In the example of FIG. 2B and an embodiment all the real handle field entries 220 are cleared as all the real handles 185 for access to objects 117 on the volume 140 have been closed, or are otherwise no longer in use.

In this example file object a.doc 215 does not have a corruption and thus in an embodiment the proxy handle 175 for a.doc, e.g., ap-hand 234, is maintained and the identification of ap-hand 234 remains in the proxy handle field 230 for the first proxy table entry 147 generated for app1 242 to access a.doc 215.

In this example file object b.doc 225 does have a corruption and thus its existing proxy handles bp-hand 238 and blp-hand 254 will no longer be able to be used by the respective apps app2 244 and app3 246 when the volume 140 storing b.doc 225 comes back on line after corruption correction processing. However, in an embodiment and this example the existing proxy handles 175 for b.doc, e.g., bp-hand 238 and blp-hand 254, continue to be maintained at this time and the identification of each of these exemplary proxy handles 175 remains in the respective proxy handle field 230 for the second and third proxy table entries 147. In this embodiment it will be left to the apps app2 244 and app3 246 to close the no longer valid proxy handles bp-hand 238 and blp-hand 254.

In an alternative embodiment and this example as file object b.doc 225 does have a corruption the proxy handle fields 230 for the second and third proxy table entries 147 generated for app2 244 and app3 246 access to b.doc 225 are cleared, or are otherwise established to be no longer in use, at this time.

In an embodiment the invalid flag fields for the second and third proxy table entries 147 remain set to indicate there is a corruption on the corresponding object b.doc 225 as at this time b.doc 225 has yet to be corrected.

In an embodiment, during a pause state the proxy f/s 115 queues all the app 170's access requests 127 to the volume 140 in its I/O queue 125. In an alternative embodiment, during a pause state the proxy f/s 115 queues those app 170's access requests 127 to the volume 140 in its I/O) queue 125 that are for objects 117 whose invalid flag field 260 is not set in the respective proxy table entry 147 for the app 170.

In an embodiment once the proxy f/s 115 are in a pause state the DCM 160 informs the PDR 190 that offline volume error correction can now be processed. In an embodiment the PDR 190 thereafter executes a corruption correction component 130, also referred to herein as error correction 130, that attempts to correct, or otherwise repair, known confirmed corruptions on a volume 140 while the volume 140 is maintained offline, and thus, unavailable to any apps 150 or users 180. In an aspect of this embodiment the error correction 130 is the spot corruption corrector 130 described in co-pending U.S. patent application Ser. No. 12/970,954, entitled "Proactive Error Scan And Isolated Error Correction," which is incorporated herein by reference in its entirety.

In an embodiment at least some apps 170 will only wait a predetermined amount of time for a volume access, i.e., I/O, request to a volume object 117 to be processed before timing out and assuming that there is an error. In an embodiment, therefore, the PDR 190 only allows error correction 130 processing, e.g., spot corruption corrector 130 processing, for confirmed corruptions on an offline volume 140 to execute for an amount of time that will not jeopardize processing queued app I/O requests 127 in a timely manner. In an embodiment the error correction 130 processing notifies the PDR 190 of the status on a volume 140 after processing each entry 155 in the volume's corrupt log 150. In an embodiment the PDR 190 will command the error correction 130 processing to stop, or, alternatively, the PDR 190 will end the error correction 130 processing for an offline volume 140, when the PDR 190 determines that there is insufficient time for the error correction 130 processing to process another entry 155 in the volume's corrupt log 150.

In an embodiment, once the error correction, e.g., spot corruption corrector, 130 processing is concluded the volume 140 is brought back online and the PDR 190 informs the DCM 160 that the volume 140 is available. In an embodiment the DCM 160 thereafter notifies all proxy f/s 115 overlaid on the real f/s 105 for the volume 140 that the volume 140 is available. In an embodiment each proxy f/s 115 thereafter reviews its proxy handle table entries 147 and processes to establish a new real handle 185 for each existing proxy handle 175 whose proxy handle table entry 147 does not have the invalid flag field 260 set.

In an aspect of this embodiment the proxy f/s 115 requests the real f/s 105 to establish a new access for each object 117 with a proxy table entry 147 whose invalid flag field 260 is not set; i.e., open each respective object 117 and establish a corresponding real handle 185 to it.

In an embodiment the real f/s 115 first validates that each such object 117 for which a new real handle 185 to correlate with an existing proxy handle 175 is to be generated has not been affected, i.e., changed or altered in any manner, by the prior error correction processing 130. In an embodiment if such an object 117 is validated as not having been affected by the prior error correction processing 130 on the volume the real f/s 115 processes to establish access to this object 117 for each respective app 170 that did have access to the object 117 prior to the volume error correction processing 130 and establishes a new real handle 185 to the object 117 for each corresponding existing proxy handle 175. In an embodiment the real f/s 105 provides each newly generated real handle 185, or access thereto, to the proxy f/s 115. In an aspect of this embodiment the proxy f/s 115 thereupon updates the real handle field 220 for each new real handle 185, and, if needed, the object identity field 210, for access to the objects 117 by the requesting apps 170.

In the event where a real handle has been requested to be generated for an object 117 that has been affected by the prior volume error correction processing 130 then in an embodiment the real f/s 105 notifies the proxy f/s 115. In an embodiment the proxy f/s 115 notifies the app(s) 170 that have currently open proxy handles 175 to the affected object 117 that the affected object 117 has been altered. In an embodiment each such app 170 can then close its currently existing proxy handle 175 to the affected object 117. In an embodiment each such app 170 can thereafter attempt to establish a new access to the affected object 117, which, if successful, will result in a new real handle 185 and a new proxy handle 175 combination being generated as previously described.

Figure 2C:
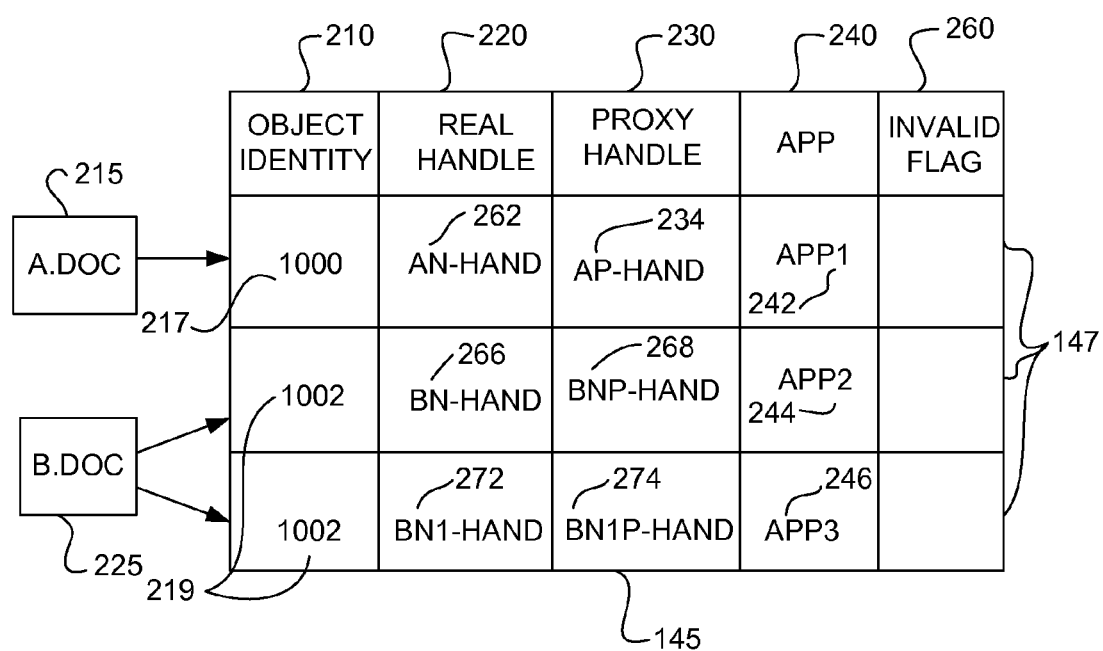

Referring to FIG. 2C, the three exemplary proxy table entries 147 of FIG. 2A are now depicted subsequent to the volume 140 containing file object a.doc 215 and file object b.doc 225 being back online following error correction processing 130. In the example of FIG. 2C a new real handle an-hand 262 has been generated for object a.doc 215 and correlated with the proxy handle ap-hand 234 which existed prior to the volume's error correction processing 130. In this example the identification of the new real handle an-hand 262 is set in the real handle field 220 for the first exemplary proxy table entry 147.

In an embodiment the new real handle an-hand 262 is generated and correlated with the existing proxy handle ap-hand 234 for object access by the app1 242 to a.doc 215 automatically without app1 242 being aware of any issue or having to provide any input to have its access to a.doc 215 restored.

In this example file object b.doc 225 had a corruption that was corrected and which has invalidated its prior existing proxy handles bp-hand 238 and blp-hand 254. In an embodiment and this example app2 244 was notified that its access to b.doc 225 was closed, or otherwise terminated, and app2 244 closes proxy handle bp-hand 238. In an embodiment and this example app2 244 instigates a new access to b.doc 225 which results in a new real handle, bn-hand 266, and a new proxy handle, bnp-hand 268, being generated. In this example and an embodiment a new entry is generated for the real handle field 220 for the second proxy table entry 147 identifying new real handle bn-hand 266 and a new entry is generated for the proxy handle field 230 for the second proxy table entry 147 identifying the new proxy handle bnp-hand 268.

In an embodiment and this example app3 246 was notified that its access to b.doc 225 was closed, or otherwise terminated, and app3 246 closes proxy handle hip-hand 254. In an embodiment and this example app3 246 instigates anew access to b.doc 225 which results in a new real handle, bnl-hand 272, and a new proxy handle, bnlp-hand 274, being generated. In this example and an embodiment a new entry is generated for the real handle field 220 for the third proxy table entry 147 identifying new real handle bnl-hand 272 and a new entry is generated for the proxy handle field 230 for the third proxy table entry 147 identifying the new proxy handle bnlp-hand 274.

In an embodiment the invalid flag fields for the second and third proxy table entries 147 are cleared to indicate there is no corruption on the corresponding object b.doc 225 as the errors in b.doc 225 were repaired during the prior error correction processing 130.

In an embodiment each proxy f/s 115 thereafter processes the queued I/O requests 127 in its respective I/O queue 125 for those objects 117 for which a new real handle 185 was successfully generated and correlated to an existing proxy handle 175 for those objects 117 unaffected by the prior error correction processing 130, utilizing the original proxy handles 175 and the newly generated real handles 185.

In an alternative embodiment, upon notification from the DCM 160 that the volume 140 is again available each proxy f/s 115 thereafter begins processing the entries in its I/O queue 125. In this alternative embodiment, for each queued I/O request 127 the proxy f/s 115 checks its proxy handle table 145 to see if the entry 147 for the object 117 that is the subject of the queued I/O request 127 and the app 170 that generated the queued I/O request 127 has its invalid flag field 260 set. If yes, in an embodiment the I/O request 127 in the I/O queue 125 is deleted, or otherwise not processed. In this situation and embodiment the proxy f/s 115 notifies the requesting app 170 that there was an error with the object 117 that the app 170 is attempting to access. In this situation and embodiment the app 170 can thereafter close its current access to the affected object 117, which will cause the corresponding proxy handle table entry 147 for the app 170's access to the object 117 to be deleted, or otherwise no longer used. In this situation and embodiment the app 170 can thereafter attempt to establish a new access to the affected object 117, which, if successful, will result in a new real handle 185 and a new proxy handle 175 combination being generated as previously described.

In this alternative embodiment, if for a queued I/O request 127 the proxy handle table entry 147 for the object 117 that is the subject of the queued I/O request 127 and the app 170 that generated the queued I/O request 127 does not have its invalid flag field 260 set then the file system environment 100 can establish a new real handle 185 to the object 117 for the app 170 and thereafter process the queued I/O request 127. In this manner the requesting app 170 does not have to be notified of any object 117 error and does not need to be involved in re-establishing access to a volume object 117 as previously discussed, minimizing the effect of a volume's corruption correction activities to apps 170.

In an aspect of this alternative embodiment the proxy f/s 15 requests the real f/s 105 to establish a new access for the object 117 that is the subject of the current queued I/O request 127 being processed. In an embodiment the real f/s 115 first validates that the object 117 that is the subject of the current queued I/O request 127 has not been affected, i.e., changed or altered in any manner, by the prior error correction processing 130. In an embodiment if the object 117 is validated as being unaffected by the prior volume error correction processing 130.

In an embodiment the real f/s 115 processes to establish access to the object 117 for the app 170 that generated the queued I/O request 127 and establishes a new real handle 185 to the object 117 for the corresponding existing proxy handle 175 which it provides to the proxy f/s 115. In an aspect of this embodiment the proxy f/s 115 thereupon updates the real handle field 220 for the real handle 185, and, if needed, the object identity field 210, for access to the object 117 by the requesting app 170 for the currently processing queued I/O request 127. In this alternative embodiment the proxy f/s 115 then processes the queued I/O request 127 using the newly established real handle 185 and the original proxy handle 175 for the object 117 and the requesting app 170.

In the event where an object 117 that is the subject of a current queued I/O request 127 is determined to have been affected by the prior volume error correction processing 130 then in an embodiment the real f/s 105 notifies the proxy f/s 115. In an embodiment the proxy f/s 115 discontinues processing the current queued I/O request 127. In an embodiment the proxy f/s 115 notifies the app 170 that issued the current queued I/O request 127 that the object 117 that is the subject of the queued I/O request 127, i.e., the affected object 117, has been altered. In an embodiment the app 170 can then close the currently existing proxy handle 175 to the affected object 117. In an embodiment the app 170 can thereafter attempt to establish a new access to the affected object 117, which, if successful, will result in a new real handle 185 and a new proxy handle 175 combination being generated as previously described.

FIGS. 3A-3D illustrate an embodiment logic flow for embodiment volume handle integrity management in an embodiment file system environment 100. While the following discussion is made with respect to systems portrayed herein the operations described may be implemented in other systems. The operations described herein are not limited to the order shown. Additionally, in other alternative embodiments more or fewer operations may be performed.

Figure 3A:
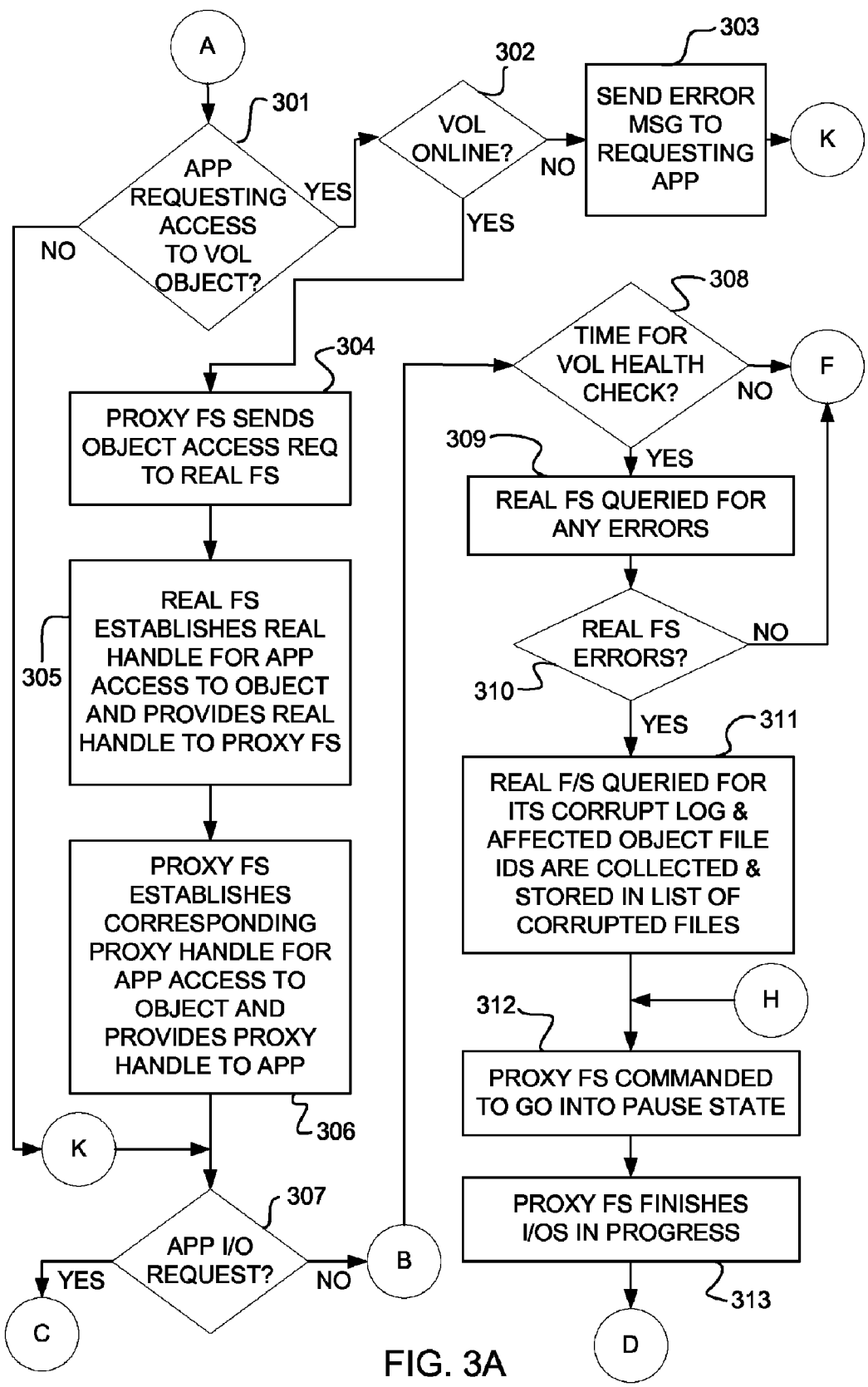
FIGS. 3A-3D illustrate an embodiment logic flow for managing continuous data availability for a volume requiring offline repair.
Figure 3B:
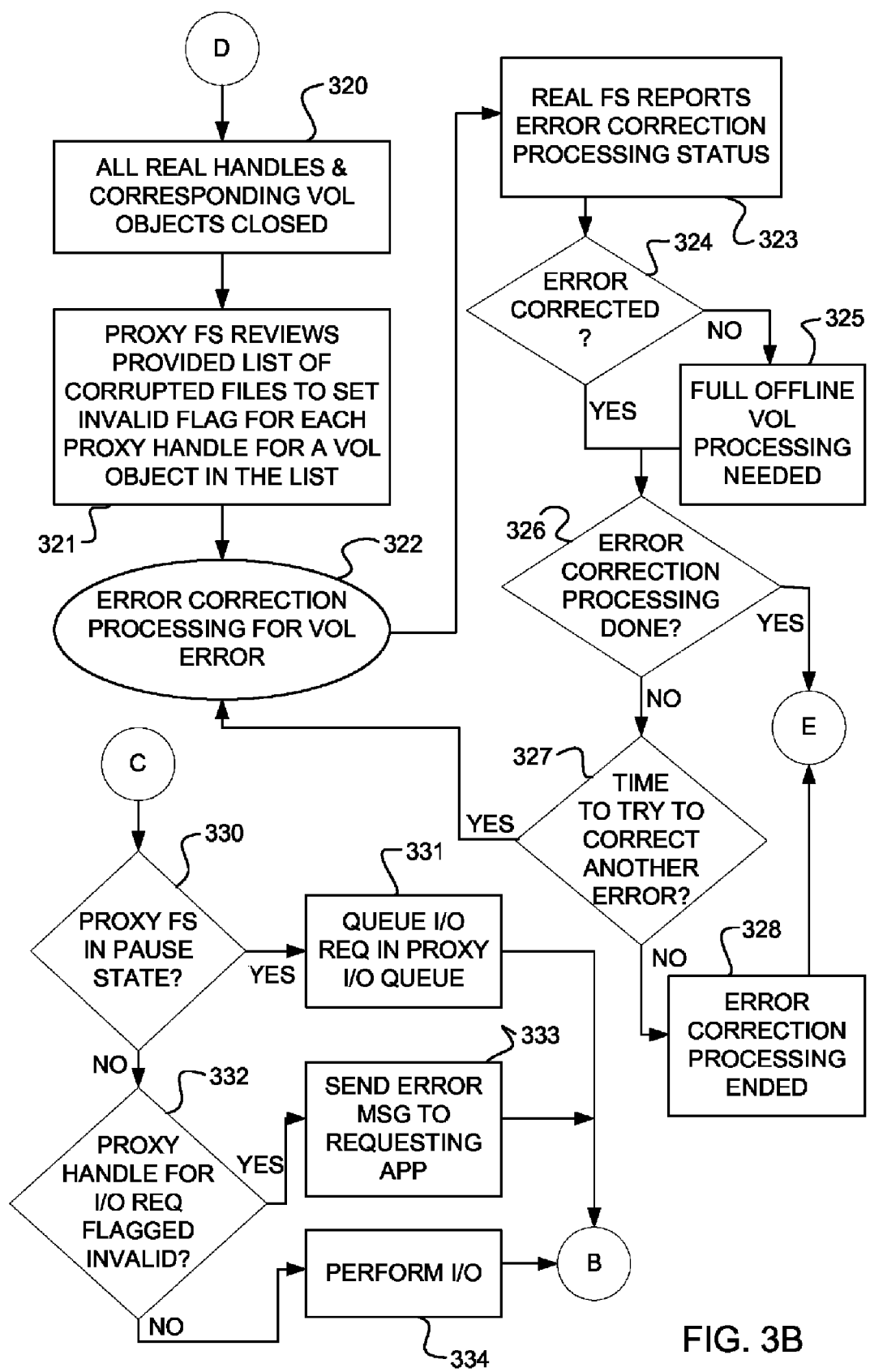

Referring to FIG. 3A in an embodiment at decision block 301 a determination is made as to whether an app is requesting an initial access to a volume object. For example, an app 170 can be requesting to open a file object 117, e.g., a.doc 215 of FIG. 2A. If an app is requesting access to a volume object, in an embodiment at decision block 302 a determination is made as to whether the volume storing the object is currently online, and thus, whether the object is currently available. If no, in an embodiment an error message is provided to the requesting app 303.

If, however, the volume storing the object the app wishes to access is currently online, in an embodiment the proxy f/s through which the app corresponds with the real f/s and underlying volume objects sends an object access request to the real f/s for the volume containing the object 304. In an embodiment the real f/s opens the object and establishes a real handle to the object 305. In an embodiment the real f/s generates an entry in its real handle table for the newly established real handle to the volume object 305. In an embodiment the real f/s provides the real handle, or, alternatively, access thereto, to the proxy f/s that forwarded the object access request to the real f/s 305.

In an embodiment the proxy f/s, upon receiving the real handle, or access thereto, generates a corresponding proxy handle for the newly generated real handle 306. In an embodiment the proxy f/s generates an entry in its proxy handle table for the newly established real handle/proxy handle combination for the app requesting the initial access to the volume object, i.e., the requesting app, 306. In an embodiment the proxy f/s provides the newly generated proxy handle to the requesting app for use by the requesting app in future I/O requests for the object 306.

Whether or not an app is requesting access to a volume object at decision block 301, in an embodiment at decision block 307 a determination is made as to whether an app has issued an I/O request for a volume object. If yes, in an embodiment and referring to FIG. 3B, at decision block 330 a determination is made as to whether the proxy f/s used by the app is currently in a pause state. If yes, in an embodiment the app's I/O request is queued in the proxy I/O queue 331.

If, however, the proxy f/s is not currently in a pause state then in an embodiment at decision block 332 a determination is made as to whether the proxy handle for the app's I/O request has been flagged invalid. In an aspect of this embodiment the proxy f/s 115 will check the entry 147 in its proxy handle table 145 for the app 170 requesting the I/O and the volume object 117 that is the subject of the I/O request, to determine if the corresponding invalid flag field 260 is set. If yes, in an embodiment the proxy f/s sends an error message to the app that output, the I/O request 333. In an aspect of this embodiment the proxy f/s 115 notifies the requesting app 170 that the app 170 will have to re-access the object 117 that is the subject of the app's current I/O request. In this aspect of this embodiment the app's re-access to the object 170 is to be done for any future app I/O requests for the object 117 as the app's handles, i.e., the proxy handle 175 and real handle 185, for access to the object 117 are no longer functional.

If at decision block 332 the proxy handle for the app's I/O request has not been flagged as invalid then in an embodiment the proxy f/s functions with the real f/s to perform the I/O request 334.

In an embodiment, whether or not an app I/O request has existed to be processed 307, in an embodiment and referring again to FIG. 3A, at decision block 308 a determination is made as to whether it is time to perform a volume health check. In an embodiment a volume health check is initiated by the PDR 190 to be performed on the underlying real f/s 105 independent of any I/O processing on the respective volume 140.

If at decision block 308 it is time for a volume health check, in an embodiment the real f/s is queried to determine if it has any confirmed corruptions 309. In an aspect of this embodiment the PDR 190 queries the real f/s 105 periodically to determine if it has any confirmed corruptions, i.e., any corruptions noted in an entry 155 of the real f/s's corrupt log 150 that will require the associated volume 140 to be taken offline for any attempted repair thereof. In an aspect of this embodiment the PDR 190 queries the real f/s 105 once a minute to determine if the real f/s 105 currently has any confirmed corruptions. In other aspects of this embodiment the PDR 190 queries the real f/s 105 at other defined periodic time intervals to determine if the real f/s 105 has any currently confirmed corruptions, e.g., once every five minutes, once every thirty seconds, etc.

In an aspect of this embodiment the real f/s 105 notifies the PDR 190 that it has confirmed corruptions in response to the PDR's query to the real f/s 105 about the health of the real f/s 105. In an alternative aspect of this embodiment the real f/s 105 provides its corrupt log 150, or in another alternative aspect, access thereto, to the PDR 190 in response to the PDR's query to the real f/s 105 about the health of the real f/s 105.

In an embodiment, as noted, if the real f/s currently has confirmed corruptions the real f/s is queried for its corrupt log 311. In an aspect of this embodiment if the real f/s currently has confirmed corruptions the PDR queries the real f/s for its corruption log, or alternatively, access thereto 311.

In an embodiment the file ids identified in the real f/s corrupt log are collected from the corrupt log and stored in a list of corrupted files 311. In an aspect of this embodiment the PDR 190 reviews the real f/s corrupt log 150, identifies the file ids for each corrupt log entry 155 and stores these identified file ids in a list or corrupted files 165.

In an embodiment the PDR 190 provides the generated list of corrupted files 165, or access thereto, to the DCM 160.

In an embodiment the list of corrupted files 165 generated for a volume 140 contains an identification of each object 117 of the volume 140 that has a confirmed corruption for which there is an entry in the volume's corrupt log 150. In an aspect of this embodiment the identification of an affected object 117 in the list of corrupted files 165 is the object's file id.

In an embodiment the list of corrupted files 165 generated for a volume 140 contains an identification of the gravity of the corruption for each object 117 identified therein. In an aspect of this embodiment the identification of the gravity of the corruption for each object 117 identified in a list of corrupted files 165 is a value that identifies the type of corruption that has been found associated with the object 117, e.g., orphan child, bad cluster, crosslink corruption, etc. In an alternative aspect of this embodiment the identification of the gravity of the corruption for each object 117 identified in a list of corrupted files 165 is a flag that signifies whether or not the corruption found associated with the object 117 is an object changing error.

As previously discussed, in an embodiment an object changing error is a corruption that when fixed will have caused the object 117 to have altered in such a manner that any apps 170 that have been accessing the object 117 prior to the maintenance for corruption correction of the object 117 offline must be notified of the corruption and must establish new handles, i.e., a new real handle 185 and a new corresponding proxy handle 175, prior to any further app 170 attempted access to the object 117.

In an alternative embodiment if an object 117 of a volume 140 has one or more confirmed corruptions, i.e., there is at least one entry 155 in the corrupt log 150 for the object 117, but none of the object's error(s) are object changing errors then the object 117 is not identified in the list of corrupted files 165 for the volume 140.

In an embodiment subsequent to the generation of the list of corrupted files for a volume the proxy f/s is commanded to go into a pause state 312. In an aspect of this embodiment the DCM 160 commands the proxy f/s 115 to go into a pause state upon receiving a list of corrupted files 165 from the PDR 190 for the underlying, volume 140.

In an embodiment, in preparation for entering a pause state the proxy f/s finalizes the processing of all existing I/O requests that are in progress 313. Referring to FIG. 2, in an embodiment all real handles to the underlying volume are closed and all currently accessible, i.e., open, volume objects are closed in preparation for taking the volume offline for error correction 320. In an embodiment, at this time the proxy f/s 115 will have no physical connection to the underlying real f/s 105 or its volume 140.

In an embodiment the proxy f/s is given, or alternatively, provided access to, the list of corrupted files which the proxy f/s reviews to utilize to set the invalid flag field for each proxy handle table entry with a file id field value included in the list of corrupted files 321. In an aspect of this embodiment the DCM 160 provides the proxy f/s 115 the list of corrupted files 165, or access thereto, for the underlying volume 140.

In an embodiment the proxy f/s enters the pause state, the underlying volume is taken offline and error correction processing is performed on the offline volume for a corruption identified in the volume's corruption log 322. In an embodiment error correction processing status is reported 323. In aspect of this embodiment the real f/s 115 reports current error correction processing status to the PDR 190 after each attempt to correct a corruption that is the subject of a corruption log entry 155.

In an embodiment at decision block 324 a determination is made as to whether the current error correction processing, status indicates an error was corrected on the volume. If no, in an embodiment full offline volume processing is needed to correct the volume and the appropriate status and/or flags are set for this condition 325.

At decision block 326 a determination is made as to whether the current error correction processing on the volume is complete, i.e., whether there are any more corrupt log entries for the offline volume being processed. If no, in an embodiment at decision block 327 a determination is made as to whether there is enough time for the error correction processing to attempt to correct another corruption identified in the offline volume's corrupt log.

As previously noted, in an embodiment at least some apps 170 will only wait a predetermined amount of time for a volume access, i.e., I/O, request to a volume object 117 to be processed before timing out and assuming that, there is an error. In an embodiment, therefore, the PDR 190 only allows error correction processing on a volume 140 for an amount of time that will not jeopardize processing queued app I/O requests 127 in a timely manner. In an embodiment the error correction processing notifies the PDR 190 of the status on a volume 140 after processing each entry 155 in the volume's corrupt log 150. In an embodiment the PDR 190 will tell the error correction processing to stop, or, alternatively, the PDR 190 will end the error correction processing for an offline volume, when the PDR 190 determines that there is insufficient time for the error correction processing to process another entry 155 in the volume's corrupt log 150.

If at decision block 327 it is determined that there is enough time for the error correction processing to attempt to correct another corruption for the offline volume then in an embodiment error correction processing continues to try and correct a volume corruption identified in another volume corruption log entry 322.

If at decision block 327 there is not enough time for the error correction processing to attempt to correct another volume confirmed corruption identified in the volume's corrupt log then in an embodiment the error correction processing is ended at this time 328.

Figure 3C:
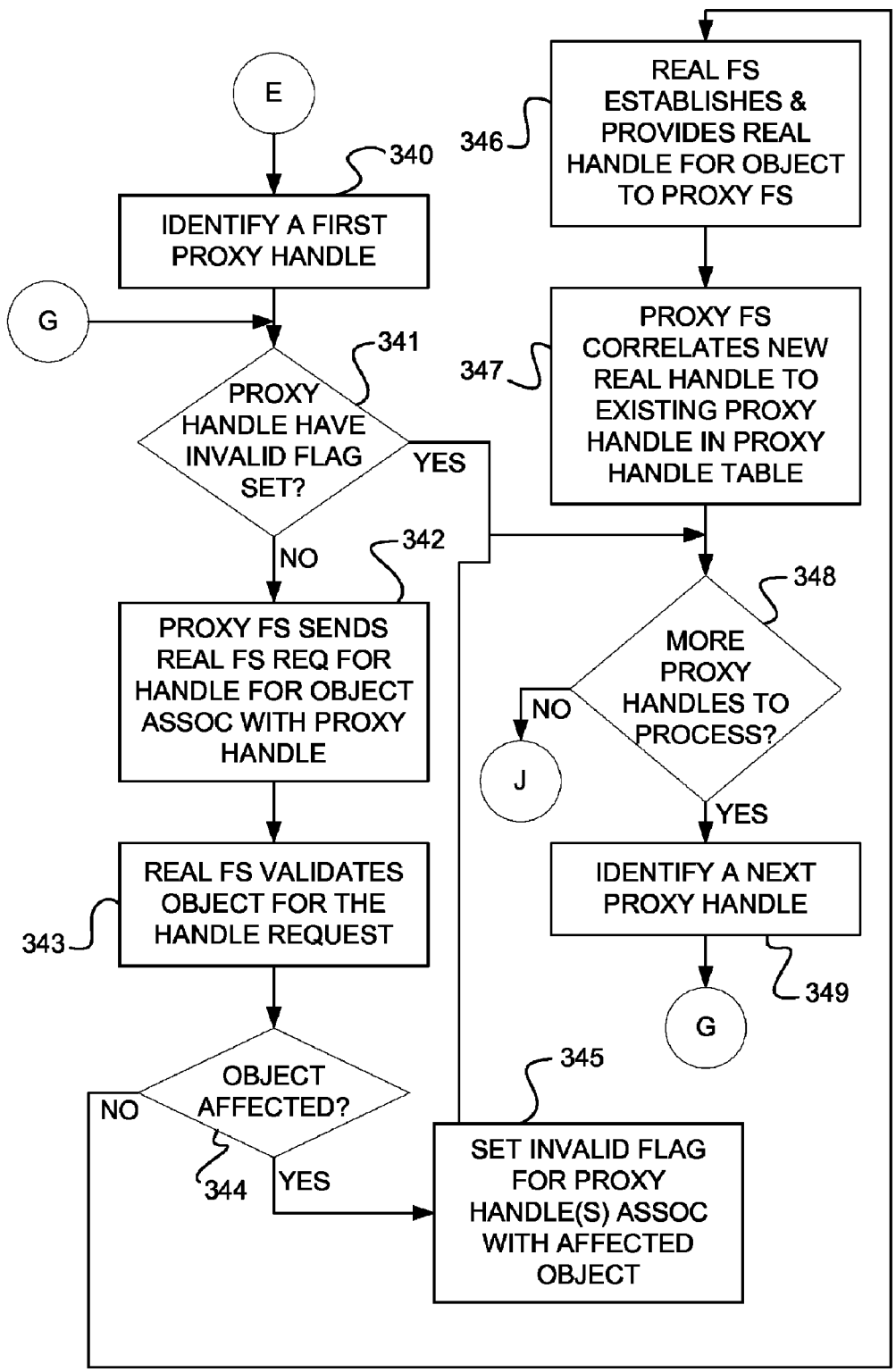
Figure 3D:
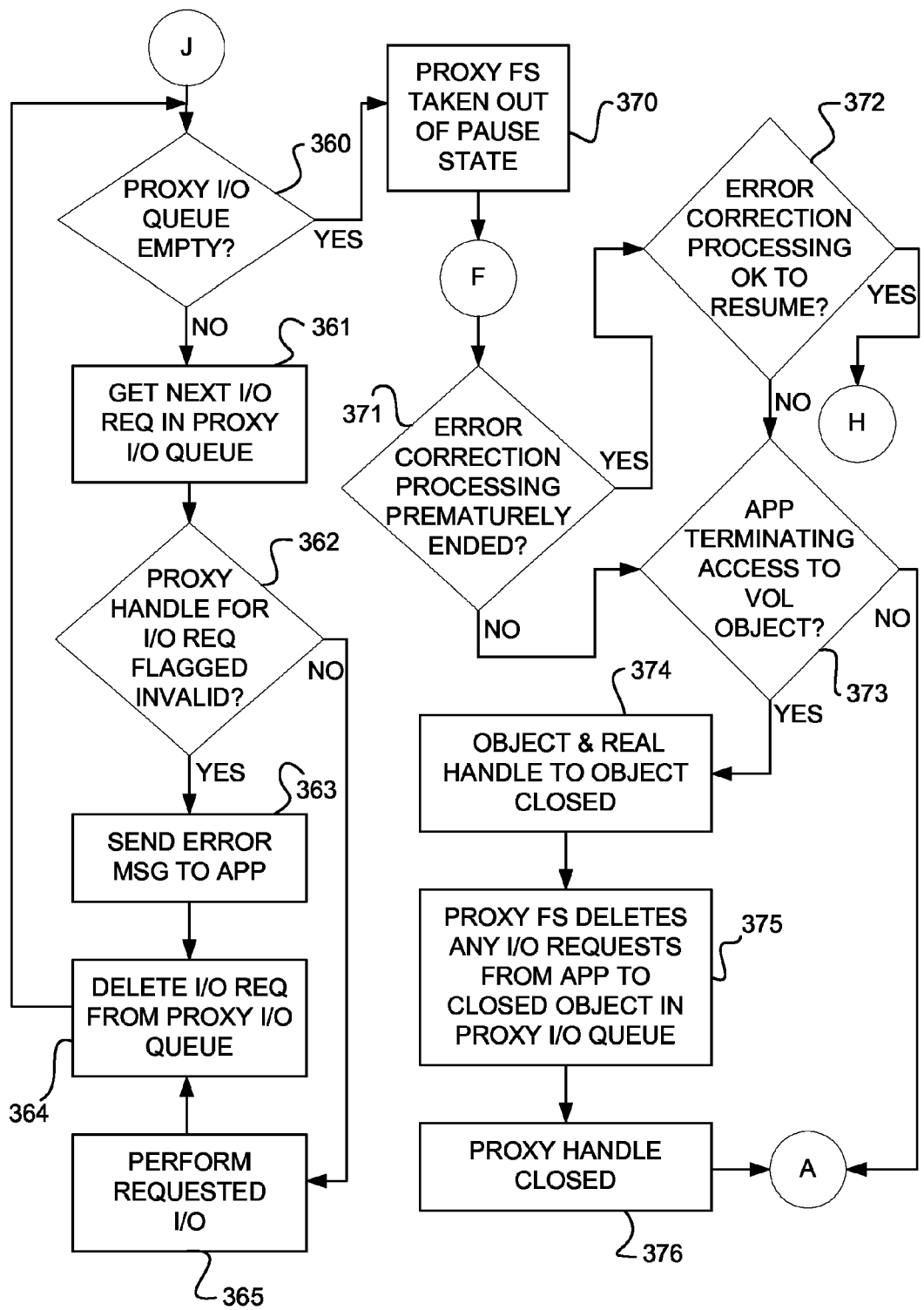

Subsequent to the error correction processing for a volume ending, in an embodiment and referring to FIG. 3C, a first proxy handle is identified in the proxy handle table 340. In an aspect of this embodiment the proxy handle 175 listed in the proxy handle field 230 of the first proxy handle table entry 147 is identified.

In an embodiment at decision block 341 a determination is made as to whether the invalid flag is set for the proxy handle. If yes, in an embodiment the proxy handle is no longer valid and the invalid flag for the proxy handle remains set.

As previously described, in an embodiment the invalid flag 260 is set for each proxy handle 175 in a proxy handle table 145 whose corresponding object 117 is identified in the real Ds corrupt log 150, and thus, has a confirmed corruption at the time the PDR 190 does a volume health check with the real f/s 105 for the volume 140. As also previously described, in an alternative embodiment objects 117 that are not designated as having object changing errors at the time of the volume health check are not included in the list of corrupted files 165, and thus, the proxy handles 175 for these objects 117 will not have their respective invalid flags 260 set.

Too, as previously described, objects 117 that are not included in the volume's corrupt log 150, and thus, are not considered to have any errors at this time are also not included in the list of corrupted files 165, and thus, the proxy handles 175 for these objects 117 will not have their respective invalid flags 260 set. In an embodiment at decision block 348 a determination is made as to whether there are any more proxy handles in the proxy handle table to process. If yes, in an embodiment a next proxy handle in the proxy handle table is identified 349 and at decision block 341 a determination is made as to whether the invalid flag for this next identified proxy handle is set.

As noted, in an embodiment all objects 117 with corruptions, including objects 117 with corruptions that are not object changing errors, are included in the list of corrupted files 165. In this embodiment the proxy handles 175 for objects with corruptions that are not object changing errors at the time of the volume health check will have their respective invalid flags 260 set. In a second alternative embodiment if at decision block 341 the invalid flag is set for a proxy handle then a determination is made as to whether the object associated with the proxy handle had a corruption that was an object changing error. In no, in an embodiment the invalid flag for the proxy handle associated with the object is cleared. In an embodiment the proxy f/s issues a request to the underlying real f/s to generate a real handle for the object for the currently identified proxy handle 342.

If at decision block 341 the currently identified proxy handle's invalid flag is not set, then in an embodiment the proxy f/s issues a request to the underlying real f/s to generate a real handle for the object for the currently identified proxy handle 342. In an embodiment the real f/s validates the object for the real handle request to ensure that it has not been affected, i.e., changed in a manner that will affect an app's access to it, 343. In an embodiment at decision block 344 a determination is made as to whether the object for the current real handle request has been affected.

If yes, in an embodiment the real f/s notifies the proxy f/s that the object that is the subject of the current real handle request has been affected 345. In an embodiment the proxy f/s sets the invalid flag for the currently identified proxy handle 345. In an aspect of this embodiment the proxy f/s sets the invalid flag for each proxy handle in the proxy table for the affected object 345. In an embodiment control returns to decision block 348 where a determination is made as to whether there are any more proxy handles in the proxy handle table to process.

If at decision block 344 the object for the current real handle request is unaffected, i.e., it has not been changed in a manner that will affect an app's access to it, then in an embodiment the real f/s opens the object for the proxy handle and generates a corresponding real handle for the object which is, or access thereto is, provided to the proxy f/s 346. In an embodiment the real f/s generates an entry in the real handle table for the newly generated real handle 346. In an embodiment the proxy f/s, upon receiving the new real handle, or access thereto, correlates the newly generated real handle with the currently identified proxy handle and updates the real handle entry in the proxy handle table accordingly 347. In this manner an app's access to an object 117 has been seamlessly reinstated without the app's intervention and without the app 170 even being aware the object's volume 140 was ever offline, and thus inaccessible.

In an embodiment at decision block 348 a determination is made as to whether there are any more proxy handles to process in the proxy handle table. If no, in an embodiment and referring to FIG. 3D, at decision block 360 a determination is made as to whether the proxy queue is empty; i.e., whether or not there are I/O requests currently queued in the proxy I/O queue. In an embodiment at decision block 360 error correction processing has been performed on the volume 140 while the volume 140 was offline, the error correction processing has been concluded and the volume has now been brought back online.

If at decision block 365 there are I/O requests currently queued in the proxy I/O queue, i.e., the proxy I/O queue is not empty, then in an embodiment the next I/O request in the I/O queue is identified, or otherwise referenced, 361. In an embodiment the next I/O request 127 identified in the I/O queue 125 is the oldest I/O request 127 in the I/O queue 125, i.e., the first I/O request 127 that was queued in the I/O queue 125 when the proxy f/s 115 was in a pause state. In an alternative embodiment the next I/O request 127 identified in the I/O queue 125 is the most recent I/O request 127 in the I/O queue 125, i.e., the last I/O request 127 that was queued in the I/O queue 125 when the proxy f/s 115 was in a pause state. In still other alternative embodiments the next I/O request 127 identified in the I/O queue 125 is determined by other criteria, i.e., the queued I/O request 127 from the app 170 with the highest importance, the queued I/O request 127 from the app 170 with the least amount of remaining time for a successful I/O to be performed, etc.

At decision block 362 a determination is made as to whether the invalid flag for the proxy handle for the currently identified queued I/O request is set. In an aspect of this embodiment the proxy f/s 115 reviews the proxy table entry 147 for the object 117 that is the subject of the currently identified queued I/O request 127 and the app 170 that issued the currently identified queued I/O request 127 to determine if the invalid flag field 260 is set.

If at decision block 362 the invalid flag for the proxy handle for the currently identified queued I/O request is set then in an embodiment an error message is sent to the app that issued the currently identified queued I/O request 363. In an embodiment and this situation the currently identified queued I/O request 127 cannot be processed with the currently, established proxy handle 175 to the object 117 for the queued I/O request 127.

If at decision block 362 the invalid flag for the proxy handle for the currently identified queued I/O request is not set then in an embodiment the currently identified queued I/O request is performed, or otherwise processed, 365. In an embodiment and this situation a new real handle 185 has already been generated for the object 117 of the currently identified queued I/O request 127 and the newly generated real handle 185 has been coordinated with the existing object's proxy handle 175 so that the currently identified queued I/O request 127 should be able to be properly processed.

In an embodiment, whether the currently identified queued I/O request is processed 369, or is not processed, with an error message being sent to the issuing app 368, in an embodiment the currently identified queued I/O request is deleted, or otherwise removed, or no longer indexed or referenced, in the proxy I/O queue 364.

In an embodiment control returns to decision block 360 where a determination is made as to whether the proxy I/O queue is now empty.

If at decision block 360 the proxy I/O queue is empty, i.e., there are no more queued I/O requests to process, then in an embodiment the proxy f/s is taken out of its pause state 370. In other embodiments the proxy f/s 115 is taken out of the pause state at other times subsequent to the volume 140 to which it interacts with being brought back online, e.g., after all the real handles 185 that can be generated for existing proxy handles 175 for objects 117 that did not have object changing errors are generated, etc.

In an embodiment at decision block 371 a determination is made as to whether the prior error correction processing for the volume to which the proxy f/s interacts was prematurely terminated, i.e., because there was insufficient time to process another volume corruption and still support queued I/O requests in a timely manner. If yes, in an embodiment at decision block 372 a determination is made as to whether it is a suitable time to resume error correction processing on the volume, i.e., take the volume offline and perform error correction processing for confirmed corruptions thereon.

If yes, in an embodiment and referring again to FIG. 3A, the proxy f/s is commanded to go into a pause state 312 in preparation for the underlying volume going offline. In an aspect of this embodiment the DCM 160 commands the proxy f/s 115 to go into a pause state upon determining that the present time is a suitable time to resume error correction processing on the volume 140.

Referring again to FIG. 3D if at decision box 371 the prior error correction processing session was not prematurely terminated or if at decision block 372 it is not a suitable time to resume error correction processing for the volume to which the proxy f/s interacts, then in an embodiment at decision block 373 a determination is made as to whether an app is terminating access to a volume object, e.g., closing the object. If yes, in an embodiment the object and its corresponding real handle are closed 374. In an embodiment the real f/s removes the corresponding real handle entry in the real handle table, or otherwise deletes it or no longer refers to or references it, 374.

In an embodiment the proxy f/s deletes, or otherwise removes or no longer refers to or references, all the I/O requests for the now closed object from the app closing the object that are currently queued in the proxy I/O queue 375.

In an embodiment the proxy handle for the closed object is also closed 376. In an embodiment the proxy f/s removes, or otherwise deletes or no longer references or refers to, the corresponding proxy handle entry in the proxy handle table for the now closed object 376. In an embodiment control returns to decision block 301 of FIG. 3A where a determination is made as to whether an app is requesting access to a volume object, e.g., attempting to open a volume object for reading and/or writing thereto.

If at decision block 373 an app is not currently requesting to terminate access to, i.e., close, a volume object, then in an embodiment control returns to decision block 301 of FIG. 3A where a determination is made as to whether an app is requesting access to a volume object.

Computing Device System Configuration

Figure 4:
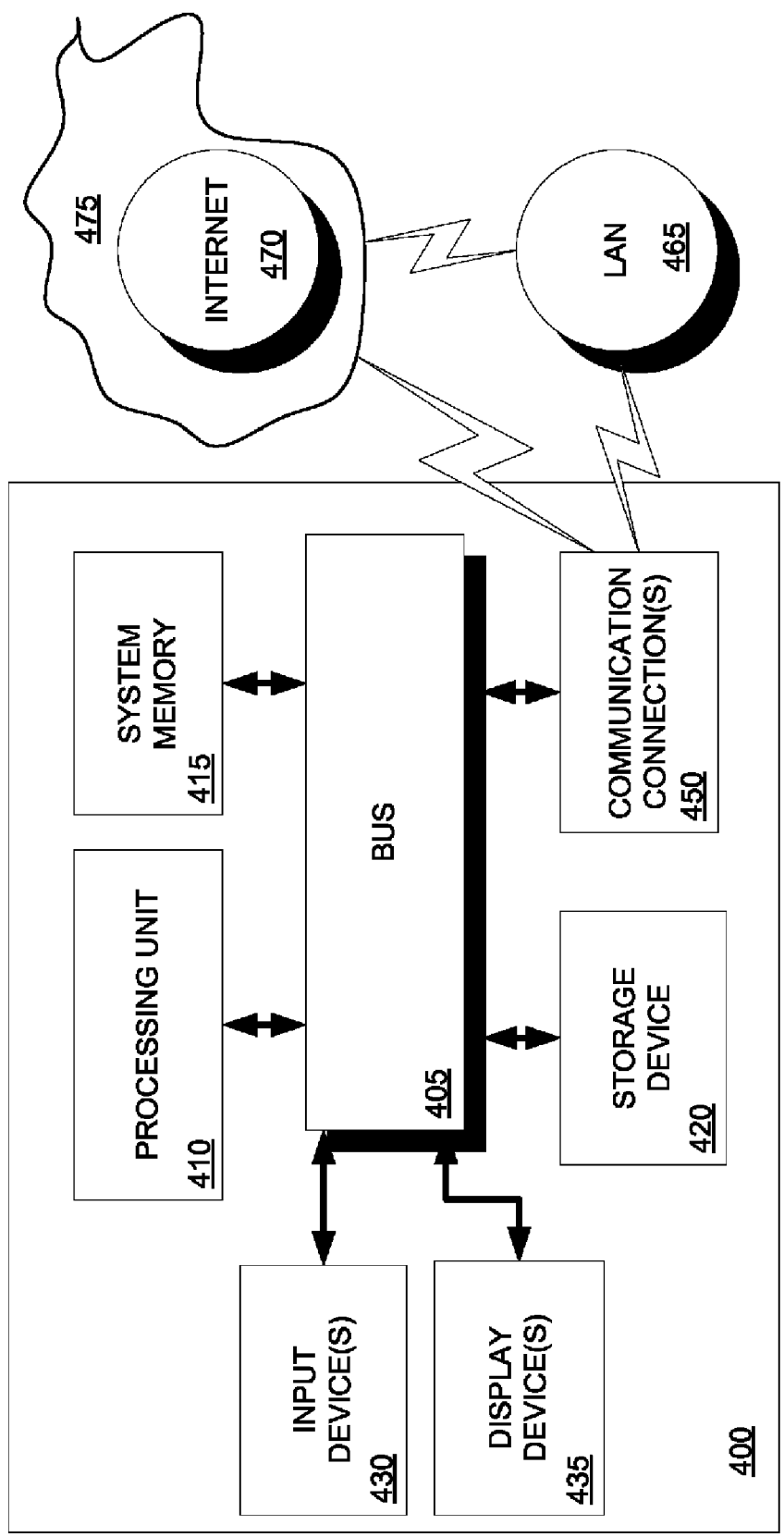
FIG. 4 is a block diagram of an exemplary basic computing device with the capability to process software, i.e., program code, or instructions.

FIG. 4 is a block diagram that illustrates an exemplary computing device system 400 upon which an embodiment can be implemented. Examples of computing device systems, or computing devices, 400 include, but are not limited to, servers, server systems, computers, e.g., desktop computers, computer laptops, also referred to herein as laptops, notebooks, etc.; etc.

The embodiment computing device system 400 includes a bus 405 or other mechanism for communicating information, and a processing unit 410, also referred to herein as a processor 410, coupled with the bus 405 for processing information. The computing device system 400 also includes system memory 415, which may be volatile or dynamic, such as random access memory (RAM), non-volatile or static, such as read-only memory (ROM) or flash memory, or some combination of the two. The system memory 415 is coupled to the bus 405 for storing information and instructions to be executed by the processing unit 410, and may also be used for storing temporary variables or other intermediate information during the execution of instructions by the processor 410. The system memory 415 often contains an operating system and one or more programs, or applications, and/or software code, and may also include program data.

In an embodiment a storage device 420, such as a magnetic or optical disk, solid state drive, flash drive, etc., is also coupled to the bus 405 for storing information, including program code of instructions and/or data, e.g., volumes 140. In the embodiment computing device system 400 the storage device 420 is computer readable storage, or machine readable storage, 420.

Embodiment computing device systems 400 generally include one or more display devices 435, such as, but not limited to, a display screen, e.g., a cathode ray tube (CRT) or liquid crystal display (LCD), a printer, and one or more speakers, for providing information to the computing device's system administrators 180 and users 180. Embodiment computing device systems 400 also generally include one or more input devices 430, such as, but not limited to, a keyboard, mouse, trackball, pen, voice input device(s), and touch input devices, which the system administrators 180 and users 180 can utilize to communicate information and command selections to the processor 410. All of these devices are known in the art and need not be discussed at length here.

The processor 410 executes one or more sequences of one or more programs, or applications, and/or software code instructions contained in the system memory 415. These instructions may be read into the system memory 415 from another computing device-readable medium, including, but not limited to, the storage device 420. In alternative embodiments, hard-wired circuitry may be used in place of or in combination with software instructions. Embodiment computing device system 400 environments are not limited to any specific combination of hardware circuitry and/or software.

The term "computing device-readable medium" as used herein refers to any medium that can participate in providing program, or application, and/or software instructions to the processor 410 for execution. Such a medium may take many forms, including but not limited to, storage media and transmission media. Examples of storage media include, but are not limited to, RAM, ROM, EEPROM, flash memory, solid state drive, CD-ROM, USB stick drives, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 415 and storage device 520 of embodiment computing device systems 400 are further examples of storage media. Examples of transmission media include, but are not limited to, wired media such as coaxial cable(s), copper wire and optical fiber, and wireless media such as optic signals, acoustic signals, RE signals and infrared signals.

An embodiment computing device system 400 also includes one or more communication connections 450 coupled to the bus 405. Embodiment communication connection(s) 450 provide a two-way data communication coupling from the computing device system 500 to other computing devices on a local area network (LAN) 465 and/or wide area network (WAN), including the world wide web, or internet, 470 and various other communication networks 475, e.g., SMS-based networks, telephone system networks, etc. Examples of the communication connection(s) 450 include, but are not limited to, an integrated services digital network (ISDN) card, modem, LAN card, and any device capable of sending and receiving electrical, electromagnetic, optical, acoustic, RF or infrared signals.

Communications received by an embodiment computing device system 400 can include program, or application, and/ or software instructions and data. Instructions received by the embodiment computing device system 400 may be executed by the processor 410 as they are received, and/or stored in the storage device 420 or other non-volatile storage for later execution.

CONCLUSION

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for continuous data availability in a file system environment, wherein the file system environment comprises at least one volume comprising at least one object stored thereon, a real file system for each volume of the file system environment, and at least one, first, proxy file system overlaid on one, first, real file system for a first volume of the file system environment, the method comprising:

establishing a first real handle to a first object stored on the first volume for use in supporting a first application accessing the first object with I/O requests via the first proxy file system, wherein the establishment of the first real handle is performed in response to the first application issuing a first I/O request for the first object;

establishing a corresponding first proxy handle to the first object stored on the first volume for the first application to utilize when accessing the first object with I/O requests via the first proxy file system, wherein the establishment of the first proxy handle is performed in response to the first application issuing a first I/O request for the first object;

opening the first object stored on the first volume for access to by the first application;

utilizing the first proxy handle and the first real handle to process I/O requests from the first application for the first object at a time subsequent to the establishment of the first real handle and the establishment of the corresponding first proxy handle;

determining there is a confirmed corruption on the first volume, wherein at least one object stored on the first volume has an error that will require the first volume to be taken offline to repair;

pausing the first proxy file system prior to taking the first volume offline to repair at least one confirmed corruption on the first volume, wherein pausing the first proxy file system comprises setting the first proxy file system to a pause state from a normal state;

taking the first volume offline to attempt to repair at least one confirmed corruption on the first volume at a first time;

automatically closing the first real handle to the first object prior to taking the first volume offline;

automatically closing the first object stored on the first volume prior to taking the first volume offline;

bringing the first volume back online at a second time, wherein the second time is subsequent to the first time;

restoring the first proxy file system from the pause state to the normal state subsequent to the first volume being brought back online at the second time;

determining subsequent to the first volume being brought back online at the second time that the first object was error free at the first time;

automatically establishing a second real handle to the first object stored on the first volume for use in supporting the first application accessing the first object with I/O requests via the first proxy file system subsequent to the first proxy file system being restored from the pause state to the normal state, wherein the second real handle is different than the first real handle;

correlating the second real handle with the first proxy handle for use in supporting the first application accessing the first object with I/O requests via the first proxy file system; and utilizing the first proxy handle and the second real handle to process I/O requests from the first application for the first object at a time subsequent to the second time.

2. The method for continuous data availability in a file system environment of claim 1, wherein the file system environment comprises a single node comprising a single computing device upon which each real file system for each volume of the file system environment and each proxy file system overlaid on a real file system of the file system environment is supported.

3. The method for continuous data availability in a file system environment of claim 1, wherein the file system environment comprises a cluster configuration comprising at least two computing devices, wherein at least one, first, volume of the file system environment is maintained on a first computing device, wherein a least one, second, volume of the file system environment is maintained on a second computing device, wherein at least one, first, proxy file system is maintained on the first computing device, and wherein at least one, second, proxy file system is maintained on the second computing device.

4. The method for continuous data availability in a file system environment of claim 1, wherein the second time comprises a time that is subsequent to a repair of at least one confirmed corruption on the first volume.

5. The method for continuous data availability in a file system environment of claim 1, further comprising:

establishing a proxy handle table for the first proxy file system, wherein the proxy handle table comprises an entry for each proxy handle that is established for an object stored on the first volume for use in supporting applications accessing the objects stored on the first volume with I/O requests via the first proxy file system, and wherein each entry of the proxy handle table comprises an object identity field comprising a file id identifying an object stored on the first volume, a proxy handle field comprising an identification of a proxy handle established for accessing the object identified in the object identity field for the same proxy handle table entry, an app field comprising an identification of the application for which the proxy handle identified in the proxy handle field of the same proxy handle table entry is established for accessing the object identified in the object identity field of the same proxy handle table entry and information to provide for the generation of a real handle to correspond to the proxy handle identified in the proxy handle field of the same proxy handle table for accessing the object identified in the object identity field for the same proxy handle table entry;

identifying a set of file ids comprising at least one file id, wherein each file id of the set of file ids identifies an object stored on the first volume that has a confirmed corruption;

utilizing the set of file ids to identify at least one entry in the proxy handle table that has a value in the object identity field that is the same as a file id in the set of file ids, wherein each entry in the proxy handle table that has a value in the object identity field that is the same as a file id in the set of file ids comprises an invalid proxy table entry;

setting an invalid flag for the proxy handle identified in the proxy handle field of each invalid proxy table entry; and providing an indication that there is an error to a second application identified in an app field of a first invalid proxy table entry, wherein the indication comprises a notification to the second application that the second application has lost access to the object identified in the object identity field for the first invalid proxy table entry.

6. The method for continuous data availability in a file system environment of claim 5, wherein each proxy handle table entry further comprises a real handle field comprising an identification of the real handle established for accessing the object identified in the object identity field for the same proxy handle table entry.

7. The method for continuous data availability in a file system environment of claim wherein each entry of the proxy handle table comprises an invalid flag field and wherein setting an invalid flag for the proxy handle identified in the proxy handle field of each invalid proxy handle table entry comprises setting the invalid flag field to a predetermined value.

8. The method for continuous data availability in a file system environment of claim further comprising:

queuing each I/O request for each object stored on the first volume that is issued via the first proxy file system while the first proxy file system is set to the pause state;

determining for each I/O request that was queued while the first proxy file system was set to the pause state if the I/O request is for access to an object stored on the first volume that had a confirmed corruption at the first time;

declining to process any I/O request that was queued while the first proxy file system was set to the pause state that is for access to an object stored on the first volume that had a confirmed corruption at the first time; and processing at a third time that is subsequent to the second time when the first proxy file system is restored from the pause state to the normal state each I/O request that was queued while the first proxy file system was set to the pause state that is for access to an object stored on the first volume that was error free at the first time.

9. The method for continuous data availability in a file system environment of claim 8, wherein the invalid flag for a proxy handle is utilized to determine if an I/O request that was queued while the first proxy file system is set to the pause state is for access to an object stored on the first volume that had a confirmed corruption at the first time.

10. The method for continuous data availability in a file system environment of claim 5, further comprising:

determining for each I/O request that was queued while the first proxy file system was set to the pause state if the I/O request is for access to an object stored on the first volume that had an object changing error at the first time;

declining to process any I/O request that was queued while the first proxy file system was set to the pause state that is for access to an object stored on the first volume that had an object changing error at the first time;

processing at a third time that is subsequent to the second time when the first proxy file system is restored from the pause state to the normal state each I/O request that was queued while the first proxy file system was set to the pause state that is for access to an object stored on the first volume that was error free at the first time; and processing at the third time each I/O request that was queued while the first proxy file system was set to the pause state that is for access to an object stored on the first volume that had a confirmed error that was not an object changing error at the first time.

11. The method for continuous data availability in a file system environment of claim 1, wherein the first time comprising the time the first volume is taken offline to attempt to repair at least one confirmed corruption on the first volume comprises a predetermined volume health check time.

12. The method for continuous data availability a file system environment of claim 1, wherein error correction processing is executed to attempt to repair at least one confirmed corruption on the first volume, the method further comprising:

receiving error correction processing status that is generated for each error correction processing attempt to repair a confirmed corruption on the first volume and which comprises an indication of whether the error correction processing successfully repaired an object with a confirmed corruption that is stored on the first volume;

determining if there is sufficient time for the error correction processing to attempt to repair another object with a confirmed corruption that is stored on the first volume;

terminating error correction processing for the first volume when there is insufficient time for the error correction processing to attempt to repair another object with a confirmed corruption that is stored on the first volume; and resuming error correction processing for the first volume at a time subsequent to the termination of error correction processing for the first volume when there was insufficient time for the error correction processing to attempt to repair another object with a confirmed corruption.

13. The method for continuous data availability in a file system environment of claim 1, further comprising:

queuing each I/O request for the first object stored on the first volume while the first proxy file system is set to the pause state; and processing each I/O request for the first object stored on the first volume that was queued while the first proxy file system was set to the pause state utilizing the first proxy handle and the second real handle at a time subsequent to the second time.

14. A method thr continuous data availability in file system environment, wherein a file system environment comprises at least one, first, volume comprising at least two objects stored thereon, a real file system for each volume of the file system environment, and at least one, first, proxy file system overlaid on the first real file system for the first volume, the method comprising:

establishing a first real handle to a first object stored on the first volume for use in supporting a first application accessing the first object with I/O requests via the first proxy file system, wherein the establishment of the first real handle is performed in response to the first application issuing a first I/O request for the first object;

establishing a corresponding first proxy handle to the first object stored on the first volume for the first application to utilize when accessing the first object with I/O requests via the first proxy file system, wherein the establishment of the first proxy handle is performed in response to the first application issuing a first I/O request for the first object;

opening the first object stored on the first volume for access to by the first application;

utilizing the first proxy handle and the first real handle to process I/O requests from the first application for the first object at a time subsequent to the establishment of the first real handle and the establishment of the corresponding first proxy handle;

establishing a second real handle to a second object stored on the first volume for use in supporting a second application accessing the second object with I/O requests via the first proxy file system, wherein the establishment of the second real handle is performed in response to the second application issuing a first I/O request for the second object, and wherein the second real handle is different than the first real handle and the second object is different than the first object;

establishing a corresponding second proxy handle to the second object stored on the first volume for the second application to utilize when accessing the second object with I/O requests via the first proxy file system, wherein the establishment of the second proxy handle is performed in response to the second application issuing a first I/O request for the second object, and wherein the second proxy handle is different than the first proxy handle;

opening the second object stored on the first volume for access to by the second application;

utilizing the second proxy handle and the second real handle to process I/O requests from the second application for the second object at a time subsequent to the establishment of the second real handle and the establishment of the corresponding second proxy handle;

determining there is a confirmed corruption on the first volume, wherein the second object stored on the first volume has an error that will require the first volume to be taken offline to repair;

pausing the first proxy file system prior to taking the first volume offline to repair the error on the second object, wherein pausing the first proxy file system comprises setting the first proxy file system to a pause state from a normal state;

taking the first volume offline to attempt to repair the error on the second object at a first time;

automatically closing the first real handle to the first object prior to taking the first volume offline;

automatically closing the second real handle to the second object prior to taking the first volume offline;

successfully repairing the error on the second object stored on the first volume at a second time subsequent to the first time;

bringing the first volume back online at a third time subsequent to the second time;

restoring the first proxy file system from the pause state to the normal state subsequent to the first volume being brought back online at the third time;

determining subsequent to the first volume being brought back online at the third time that the first object was error free at the first time;

automatically establishing a third real handle to the first object stored on the first volume for use in supporting the first application accessing the first object with I/O requests via the first proxy file system subsequent to the first proxy file system being restored from the pause state to the normal state, wherein the third real handle is different than the first real handle;

correlating the third real handle to the first object with the first proxy handle to the first object for use in supporting the first application accessing the first object with I/O requests via the first proxy file system;

utilizing the first proxy handle and the third real handle to process the first application for the first object at a time subsequent to the third time;

closing the second proxy handle to the second object at a time subsequent to the second time; and providing an indication that there is an error to the second application at a time subsequent to the third time, wherein the indication comprises a notification to the second application that the second application has lost access to the second object.

15. The method for continuous data availability in a file system environment of claim 14, wherein the first real handle is established by the first real file system, the second real handle is established by the first real file system, the third real handle is established by the first real file system, the first proxy handle is established by the first proxy file system, and the second proxy handle is established by the first proxy file system.

16. The method for continuous data availability in a file system environment of claim 14, further comprising:
  queuing each I/O request for the first object while the first proxy file system is set to the pause state; and
  processing at a time subsequent to the third time each I/O request for the first object that was queued while the first proxy file system was set to the pause state utilizing the first proxy handle and the third real handle.

17. The method for continuous data availability in a file system environment of claim 14, further comprising:
  queuing each I/O request for the first object that is issued via the first proxy file system while the first proxy file system is set to the pause state;
  queuing each I/O request for the second object that is issued via the first proxy file system while the first proxy file system is set to the pause state;
  declining to process any I/O request for the second object that was queued while the first proxy file system was set to the pause state; and
  processing at a time subsequent to the third time each I/O request for the first object that was queued while the first proxy file system was set to the pause state utilizing the first proxy handle and the third real handle.

18. The method for continuous data availability in a file system environment of claim 14, further comprising:
  creating a proxy handle table for the first proxy file system, wherein the proxy handle table comprises an entry generated for the first proxy handle and an entry generated for the second proxy handle, wherein each entry of the proxy handle table comprises a file id field comprising a file id identifying the object for which the proxy handle for which the proxy handle table entry was generated was established, wherein each entry of the proxy handle table comprises a proxy handle field comprising an identification of the proxy handle for which the proxy handle table entry was generated, wherein each entry of the proxy handle table comprises an app field comprising an identification of the application for which the proxy handle for which the proxy handle table entry was generated was established for use in supporting access to an object stored on the first volume, and wherein each entry of the proxy handle table comprises an invalid flag field that when set to a first predetermined value comprises an indication that the proxy handle for which the proxy handle table entry was generated is no longer valid for use in accessing the object identified in the file id field of the same proxy handle table entry;

identifying a set of file ids comprising at least one file id that identifies the second object stored on the first volume;

utilizing the set of file ids to identify the entry in the proxy handle table for the second proxy handle as an entry for an invalid proxy handle;

setting the invalid flag field of the entry in the proxy handle table for the second proxy handle to the first predetermined value upon the identification of the entry in the proxy handle table for the second proxy handle as an entry for an invalid proxy handle; and providing an indication that there is an error to the second application identified in the app field of the entry in the proxy handle table for the second proxy handle subsequent to setting the invalid flag field of the entry in the proxy handle table for the second proxy handle to the first predetermined value, wherein the indication comprises a notification to the second application that the second application has lost access to the object identified in the file id field of the entry in the proxy handle table for the second proxy handle.

19. A file system environment that supports continuous data availability, the file system environment comprising:

at least one volume comprising at least one object stored thereon;

a real file system for each volume of the file system environment;

at least one, first, proxy file system overlaid on one, first, real file system for a first volume of the file system environment;

a first real handle to a first object stored on the first volume for use in supporting a first application accessing the first object with I/O requests via the first proxy file system, wherein the first real handle is established by the first real file system in response to the first application issuing a first I/O request for the first object, and wherein the first real handle is closed when the first volume is offline;

a first proxy handle to the first object stored on the first volume for the first application to utilize when accessing the first object with I/O requests via the first proxy file system, wherein the first proxy handle is established in response to the first application issuing a first I/O request for the first object;

a corruption detection component comprising the capability to identify confirmed corruptions on objects stored on the volumes of the file system environment, wherein a confirmed corruption comprises an error on an object of a volume that an attempt will be made to repair when the volume is taken offline;

a corruption correction component comprising the capability to attempt to repair at least one confirmed corruption on at least one object stored on the first volume of the file system environment when the first volume is offline and the first real handle is closed;

a proxy handle table comprising an entry for the first proxy handle, wherein the entry comprises an invalid flag field that is set to a predetermined value when the first object is error free, and wherein the invalid flag field for the entry is referenced to determine that the first proxy handle can be utilized by the first application subsequent to the corruption correction component attempting to repair at least one confirmed corruption on at least one object stored on the first volume of the file system environment; and a second real handle to the first object stored on the first volume for use in supporting the first application accessing the first object with I/O requests via the first proxy file system subsequent to the corruption correction component attempting to repair at least one confirmed corruption on at least one object stored on the first volume of the file system environment, wherein the second real handle is automatically established by the first real file system, and wherein the second real handle is different than the first real handle.

20. The file system environment that supports continuous data availability of claim 19, further comprising:

a proxy queue comprising at least one stored I/O request issued from the first application for the first object when the first volume is offline while the corruption correction component is attempting to repair at least one confirmed corruption on at least one object stored on the first volume of the file system environment;

a corrupt log for the first volume comprising at least one entry comprising an identification of a corruption for an object stored on the first volume;

a set of corrupt file ids comprising a file id identifying each object for which there is an entry in the corrupt log for the first volume; and the capability to utilize the set of corrupt file ids to identify the first proxy handle, wherein the first proxy handle is not established for any object stored on the first volume that has a confirmed corruption.

\* \* \* \* \*